(12) United States Patent
Sugiyama et al.

(10) Patent No.: US 6,291,815 B1
(45) Date of Patent: Sep. 18, 2001

(54) DEVICE FOR MEASURING ROTATION ANGLE OF ROTARY ELEMENT BY UNIT ANGLES GROUPED FOR FIVE UNITS

(75) Inventors: Mizuho Sugiyama, Toyota; Shoji Inagaki, Numazu; Takashi Kondo, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/303,691

(22) Filed: May 3, 1999

(30) Foreign Application Priority Data

May 26, 1998 (JP) .................................................. 10-161446

(51) Int. Cl.[7] ...................................................... G01D 5/34
(52) U.S. Cl. ................... 250/231.13; 250/231.18; 356/139; 341/13
(58) Field of Search .................... 250/231.13–231.18, 250/232, 233, 236, 559.14, 559.15; 356/138, 139; 341/13, 10, 11

(56) References Cited

U.S. PATENT DOCUMENTS

| 4,593,269 |   | 6/1986 | Nakamura et al. | 340/347 |
| 4,827,123 | * | 5/1989 | Gray | 250/231.14 |
| 5,003,171 | * | 3/1991 | Paley | 250/231.14 |
| 5,091,643 | * | 2/1992 | Okutani et al. | 250/231.14 |

FOREIGN PATENT DOCUMENTS

| 42 43 778 A1 | 6/1994 | (DE) . |
| 2 529 665 A1 | 7/1982 | (FR) . |
| 2 045 990 A | 11/1980 | (GB) . |
| 4-278883 | 10/1992 | (JP) . |
| 6-127417 | 5/1994 | (JP) . |
| 9-113260 | 5/1997 | (JP) . |

* cited by examiner

Primary Examiner—Que T. Le
Assistant Examiner—Thanh X. Luu
(74) Attorney, Agent, or Firm—Oliff & Berridge, PLC

(57) ABSTRACT

A device for measuring a rotation angle of a rotary element has first, second and third photo-electric sensors, and a rotary disk having first and second circular arrays of openings, each radial edge of the first array of openings being adapted to be detectable by the first photo-electric sensor so as to generate a first electric signal alternating between "on" and "off" each time when the rotary disk rotates each five times of a unit angle, each radial edge of the second array of openings being adapted to be detectable by the second and third photo-electric sensors so as to generate second and third electric signals, respectively, the second and third signals each alternating between either "on" and "off" or "off" and "on" each time when the rotary disk rotates alternately two times and three times of the unit angle, the "on" and "off" alternations of the first, second and third signals being shifted from one another by a multiple (including one) of the unit angle, wherein the "on" and "off" alternations of the first, second and third signals successively occurs are counted to obtain a rotation angle of the disk, and various irregularities in the occurrence of the "on" and "off" signals are checked by the order of occurrence thereof in each set of five consecutive occurrences thereof.

7 Claims, 22 Drawing Sheets

NORMAL (RIGHT TURN)

ERROR B (LEFT TURN)

ERROR D (LEFT TURN)

ERROR J (LEFT TURN)

ERROR F (RIGHT TURN)

ERROR I (LEFT TURN)

ERROR D (LEFT TURN)

ERROR D (LEFT TURN)

DEVICE FOR MEASURING ROTATION ANGLE OF ROTARY ELEMENT BY UNIT ANGLES GROUPED FOR FIVE UNITS

BACKGROUND OF THE INVENTION

1. Field of the Invention

The present invention relates to a device for measuring a rotation angle of a rotary element, and more particularly, to a rotation angle measuring device employing two circular arrays of signaling means arranged coaxially around a center of rotation and three detection means for detecting the signaling means.

2. Description of the Prior Art

As a typical construction of a rotation angle sensor, it is known to prepare a shutter disk adapted to rotate in accordance with a rotation of a rotary element of which a rotation angle is to be measured, the shutter disk having a circular array of slits centered at the rotation axis of the disk, while a light emitter and a light receiver are arranged on opposite sides of the shutter disk to align with the circular array of the slits, so that a series of electrical pulses are obtained according to a rotation of the shutter disk. In such a construction, when two sets of light emitters and light receivers are provided with a relative shifting including a fraction of the pitch of the array of the slits therealong, it is possible to detect the rotation of the shutter disk, with an identification of either of two opposite directions of rotation according to an identification of either of two different relative shiftings in the occurrence of the detection of light by the two light receivers.

When such a photo-electric sensor composed of a light emitter and a light receiver to operate with an array of slits of a shutter disk has been developed to be of some semiconductor constructions including a light emitting diode and a photo transistor, there arose a problem that the measurement of a rotation angle based upon the counting of electric pulses generated in the photo transistor due to irradiation and non irradiation of the photo transistor to the light emitted from the light emitting diode through the slits of the shutter disk is often liable to an error due to electrical noises induced in either or both of the light emitting diode and the photo transistor. If such errors in the counting due to electrical noises are left uncorrected, the errors are accumulated so much that the measurement is rendered useless. In Japanese Patent Laid-open Publication 9-113260, it is described that if such a counting error occurs in a rotation angle sensor for a steering shaft of a vehicle, the error is corrected each time when the steering shaft was turned beyond a predetermined limit angle.

SUMMARY OF THE INVENTION

In the modern art of vehicle behavior control for automatically controlling the running behavior of vehicles to be more stable against spinning, difting out or other instabilities, the rotation angle of the steering shaft is one of the most important parameters to be known at high accuracy. If any such counting error has occurred in the rotation angle sensor of the steering shaft of a vehicle, the error should be detected for a correction as soon as possible before the steering shaft is turned so large as to traverse a relatively large limit angle.

Therefore, it is a primary object of the present invention to provide an improved device for measuring a rotation angle of a rotary element so as to be able to detect an error in the measurement almost immediately upon the occurrence thereof.

It is a further object of the present invention to provide such an improved rotation angle measuring device with an ability of identifying the kinds of errors occurred.

According to the present invention, the above-mentioned primary object is accomplished by a device for measuring a rotation angle of a rotary element, comprising:

first, second and third detection means;

rotary means rotatable about a central axis thereof in accordance with a rotation of the rotary element, the rotary means having first and second circular arrays of signaling means arranged coaxially around the central axis thereof, the first array of signaling means being adapted to be detectable by the first detection means so as to generate a first signal alternating between "on" and "off" each time when the rotary means rotate each five times of a unit angle, the second array of signaling means being adapted to be detectable by the second and third detection means so as to generate second and third signals, respectively, the second and third signals each alternating between either "on" and "off" or "off" and "on" each time when the rotary means rotate alternately two times and three times of the unit angle, the "on" and "off" alternations of the first, second and third signals being shifted from one another by a multiple (including one) of the unit angle;

means for increasing a measurement value of the rotation angle of the rotary element by the unit angle each time when one of the "on" and "off" alternations of the first, second and third signals successively occurs in a first order with regard to the first, second and third signals, while decreasing the measurement value by the unit angle each time when one of the "on" and "off" alternations of the first, second and third signals successively occurs in a second order with regard to the first, second and third signals opposite to the first order, so as to provide the measurement value with a positive/negative sign indicative of a direction of the rotation; and means for checking each occurrence of the "on" and "off" alternations of the first, second and third signals with respect to at least one of the first and second orders in each set of five consecutive occurrences of the "on" and "off" alternations, so as to detect an error in the order, when occurred.

The device may further comprise means for counting each detection of an error by the checking means, so as to stop the rotation measurement operation of the device when the count reaches a predetermined count number.

The device may further comprise means for dispatching a warning signal when the predetermined number of errors have been counted.

As a preferred embodiment, the device may be constructed such that the rotary means comprise a disk member, the signaling means comprise first and second circular arrays of openings formed therein such that each opening presents a pair of radial edges circumferentially spaced with an angle of a corresponding multiple of the unit angle, and the first, second and third detection means comprise first, second and third sets of light emitting diode and photo transistors, each set of the light emitting diode and the photo transistor being adapted to detect the radial edges of the corresponding array of the openings according to whether or not a light beam emitted from the light emitting diode is received by the photo transistor through a corresponding one of the openings. In such an embodiment, the openings of the first array may be a notch open to a periphery of the disk.

BRIEF DESCRIPTION OF THE DRAWINGS

In the accompanying drawings.

DESCRIPTION OF THE PREFERRED EMBODIMENT

Figure 1:
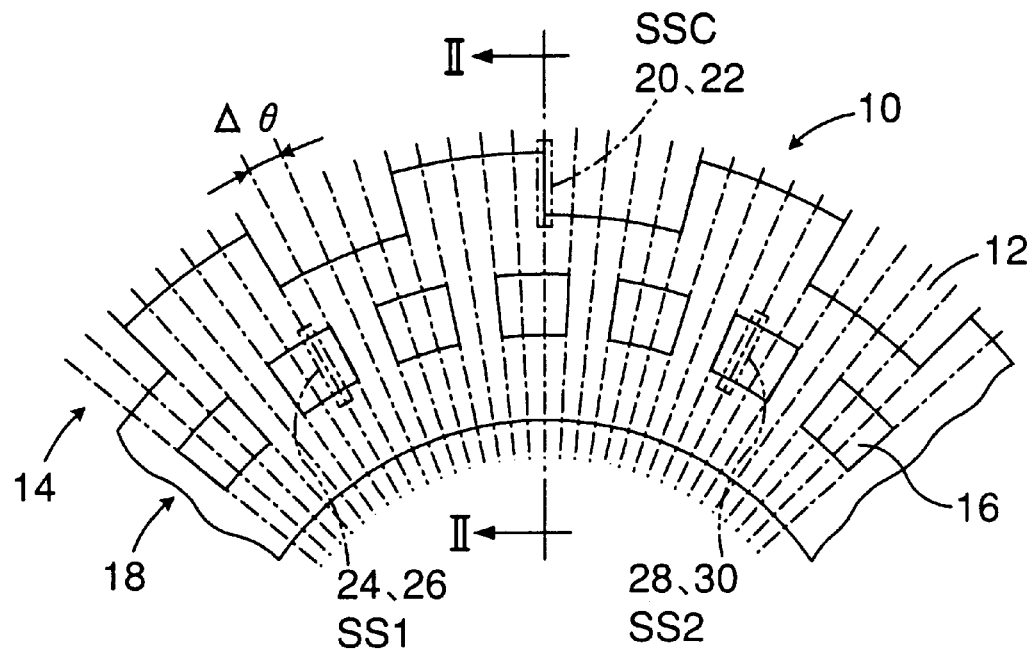
FIG. 1 is a somewhat schematic plan view of a part of a shutter disk forming a part of an embodiment of the device of the present invention, constructed as a device for measuring a rotation angle of a steering shaft of a vehicle.
Figure 2:
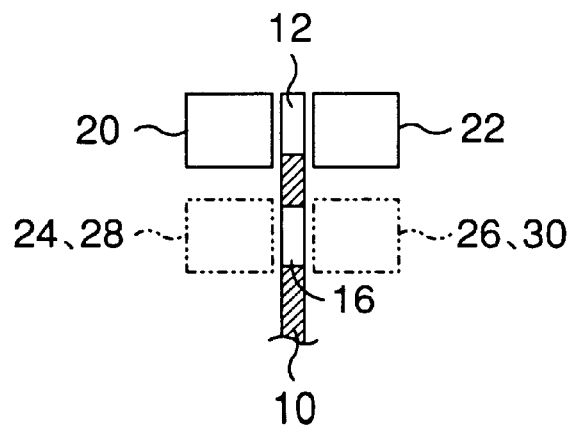
FIG. 2 is a somewhat schematic cross sectional view taken along line II—II in FIG. 1, also showing an embodiment of three sets of photo-electric sensors adapted to cooperate with the shutter disk.

In the following, the present invention will be described in more detail with respect to a preferred embodiment thereof Referring to FIG. 1 showing, in a somewhat schematic plan view, a part of a shutter disk forming a part of an embodiment of the device of the present invention, constructed as a device for measuring a rotation angle of a steering shaft of a vehicle, and FIG. 2 showing, also in a somewhat schematic illustration, a cross section taken along line II—II in FIG. 1, the shutter disk generally designated by 10 is adapted to rotate around its central axis C in accordance with a rotation of a steering shaft of a vehicle (both not shown), so as to measure the rotation angle of the steering shaft in a manner described hereinbelow.

The shutter disk 10 has a first circular array 14 of notches 12 and a second array 18 of holes 16 as illustrated in FIGS. 1 and 2. In the shown embodiment, the 360° angular area of the shutter disk around the central axis C is equally divided into 320 unit angle areas as illustrated in FIG. 1, each unit angle $\Delta\theta$ being 1.125°. The notches 12 of the first array 14 are each formed to occupy an angle of 5 times of the unit angle, i.e. 5.625°, with each spacing of the same degree. The holes 16 of the second array 18 are each formed to occupy an angle of three times of the unit angle, i.e. 3.375°, and spaced from adjacent ones by an angle of two times of the unit angle, i.e. 2,250°.

In this connection, as will be appreciated after a through review of the present specification and the accompanying drawings, the three times of the unit angle of the opening of each hole 16 and the two times of the unit angle of the spacing between each two adjacent holes 16 may be optionally exchanged with one another such that each similar hole is open for an angle of two times of the unit angle, while each two adjacent ones of such holes are spaced from one another with a spacing corresponding to three times of the unit angle, because the essential function of those holes is to provide two radial edges which traverse the light beam emitted from the light emitting diode 24 or 28 to the corresponding photo transistor 26 or 30. Similarly, as will be also appreciated, the relative angular positioning between the array 14 of the notches 12 and the array 18 of the holes 16 may be optionally changed from that shown in FIG. 1 as long as none of the radial edges of the holes 16 radially aligns with any one of those of the notches 12, because such variations are only a matter that which of the several possible serial patters of on and off electric pulses available are assigned to indicate which of the left turn and right turn of the shutter disk. It will go without saying that the notches 12 may be replaced by holes of the same angular opening and spacing, while the radial relative position between the array 14 of the notches 12 and the array 18 of the holes 16 may be exchanged oppositely, with or without an accompanying modification that the holes 16 are modified to notches. Further, it will be an obvious modification within the scope of equivalence that a third array of holes similar to the array 18 of the holes 16 are provided separately for a below-mentioned third set of light emitting diode and photo transistor, although such a modification will provide no particular advantage.

A set of a light emitter 20 and an light receiver 22 forming a first photo sensor SSC are provided adjacent to a radial region of the shutter disk to oppose the first array 14 of the notches 12. The light emitter 20 may be made of a light emitting diode adapted to emit a light beam toward the light receiver 22 which may be made of a photo transistor. Similarly a second set of a light emitter 24 and a light receiver 26 forming a second photo sensor SS1 are provided adjacent to a radial region of the shutter disk to oppose the second array 18 of the openings 16. As shown in FIG. 1 as an embodiment, the second set of the light emitter 24 and the light receiver 26 are angulary shifted relative to the first set of the light emitter 20 and the light receiver 22 by an angle of 10 times of the unit angle $\Delta\theta$ in the counter-clockwise direction. Further, a third set of a light emitter 28 and a light receiver 30 forming a third photo sensor SS2 are provided adjacent the radial region of the shutter disk also to oppose the second array 18 of the openings 16. In the shown embodiment, the third set of the light emitter 28 and the light receiver 30 are angulary shifted relative to the first set of the light emitter 20 and the light sensor 22 by an angle of 9 times of the unit angle $\Delta\theta$ in the clockwise direction opposite to the second sets of the light emitter 24 and the light receiver 26 with respect to the first set of the light emitter 20 and the light receiver 22.

Figure 3:
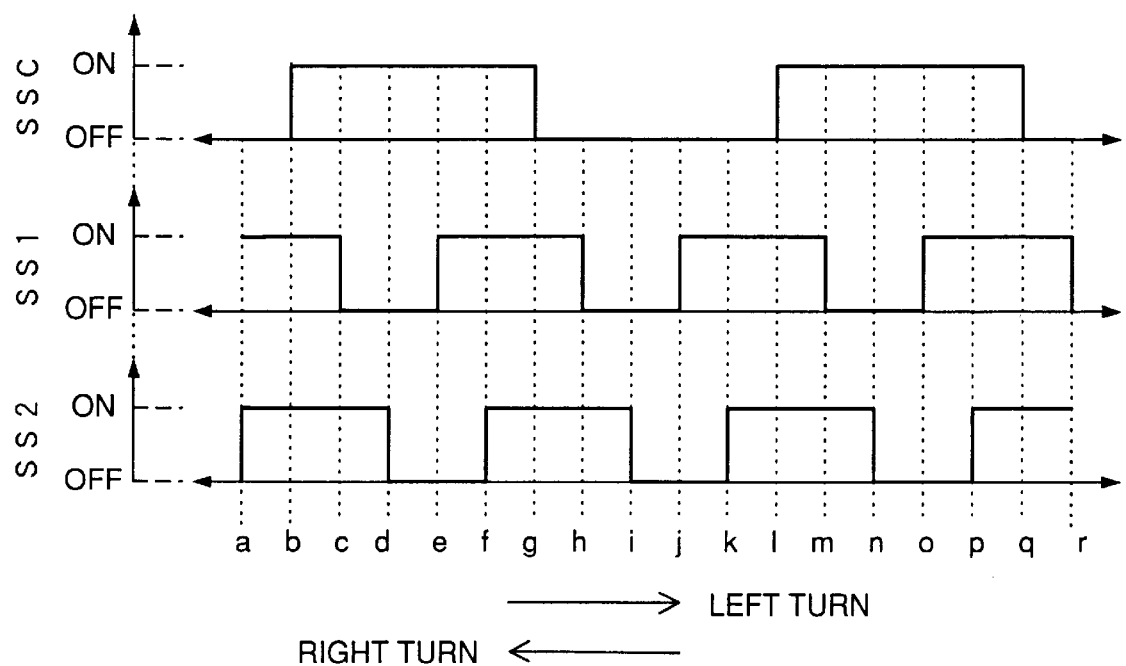
FIG. 3 is a diagram showing on-off electric pulses generated by the combination of the shutter disk and the three sets of photo-electric sensors shown in FIGS. 1 and 2.

Each set of the light emitters 20, 24 and 28 and the light receivers 22, 26 and 30 detects each one of the notches 12 or the holes 16 in accordance with a rotation of the shutter disk 10, so that each corresponding electric signal is generated to be "on" in an angular region in which the corresponding light receiver is irradiated by the cooperating light emitter through each notch 12 or each hole 16, while the electric signal is made "off" in an angular region in which the corresponding light receiver is intercepted from the irradiation of the cooperating light emitter by the non-perforated portion of the shutter disk 10, whereby the electric signal alternates between "on" and "off", while forming an edge between the "on" and "off" regions of the electric signal at the angular positions corresponding to the radial edges of the notches 12 or the holes 16. Such an alternation of "on" and "off" of each of the electric signals generated by the photo sensors SSC, SS1 and SS2 is shown in FIG. 3. In referring to FIG. 3, it will be appreciated that the angular position of the shutter disk 10 relative to the sensors SSC, SS1 and SS2 shown in FIG. 1 corresponds to an assumption that the sensors SSC, SS1 and SS2 are aligned to position "b" or "1", and the sensors SSC, SS1 and SS2 shift rightward in FIG. 3 according to a counter-clockwise rotation of the shutter disk 10, i.e. a left turn of the steering, while the sensors SSC, SS1 and SS2 shift leftward in FIG. 3 according to a clockwise rotation of the shutter disk 10, i.e. a right turn of the steering. In other words, if the shutter disk 10 is being turned in the counter-clockwise direction, the sensor SSC located at position "b" or "1" is just going to newly output an "on" signal, while the sensor SS1 located at position "b" or "1" has already been outputting an "on" signal over an angular region of one unit angle, and the sensor SS2 has already been outputting an "on" signal over an angular region of two unit angles.

It will be appreciated that such a rectangular pulse shape as shown in FIG. 3 is due to an ideological illustration for the convenience of description, and that the actual electric pulses are obtained by shaping a continually changing curve with a threshold level so that the output is perceived as "on" during a period in which the curve rises above the threshold level, while the output is perceived as "off" during a period in which the curve sinks below the threshold level. Further, in connection with the above-mentioned availability of the modification that the alternate signaling by the array of holes 16 and the sensors SS1 and SS2 of "on" and "off" at a rhythm three and two may be changed to the signaling of "on" and "off" at a rhythm of two and three, it will be appreciated that such a modification is just to turn over the three ranked diagram of FIG. 3 upside down, as far as such a diagram is concerned.

Figure 4:
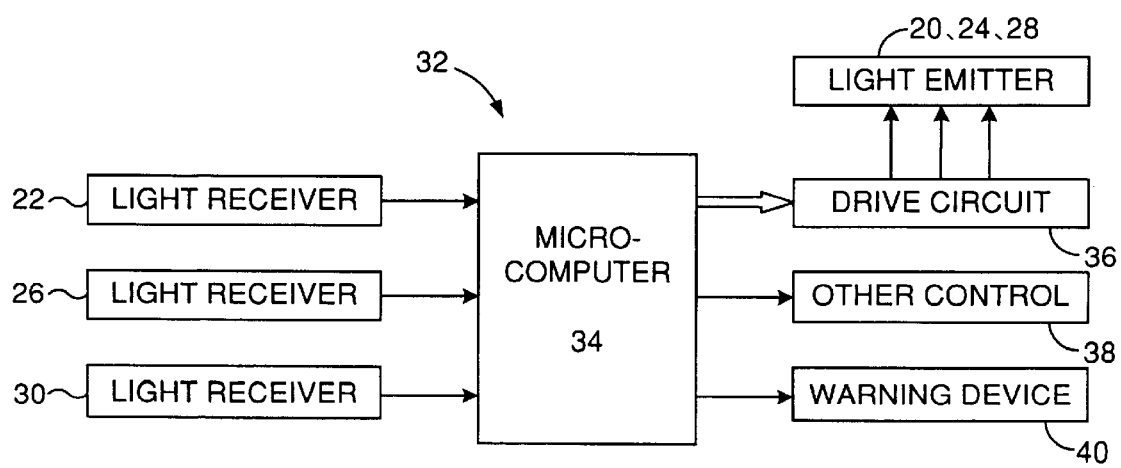
FIG. 4 is a schematic illustration of a part of the above-mentioned embodiment of the device of the present invention, adapted to cooperate with the shutter disk to generate an electric signal indicating a rotary angle of the shutter disk.

FIG. 4 shows diagrammatically an electrical part of the embodiment, adapted to treat the outputs of the light receivers 22, 26 and 30 for measuring a rotation angle of the shutter disk 10. The electrical part generally designated by 32 is essentially constructed by a microcomputer 34 of an ordinary construction, including a central processor unit, a read only memory, a random access memory, input and output port means and a common bus interconnecting these elements. The microcomputer 34 operates the light emitters 20, 24 and 28 such as light emitting diodes via a drive circuit 36. The microcomputer receives output signals of the light receivers 22, 26 and 30 such as photo transistors, and processes these signals in the manner described in detail hereinbelow, outputting a measurement value of the rotation angle of the shutter disk 10 toward other control systems 38 such as a vehicle stability control system or the like. The microcomputer 34 further dispatches an output for actuating a warning device 40 when an error beyond a predetermined limit number of times is detected in the measurement of the rotation angle based upon the output signals from the light receivers 22, 26 and 30, as described in detail hereinbelow.

In the following, further details of the construction of the device shown in FIGS. 1, 2 and 4 will be described in the form of its operation by referring to FIGS. 5–9 in the form of flowcharts.

Figure 5:
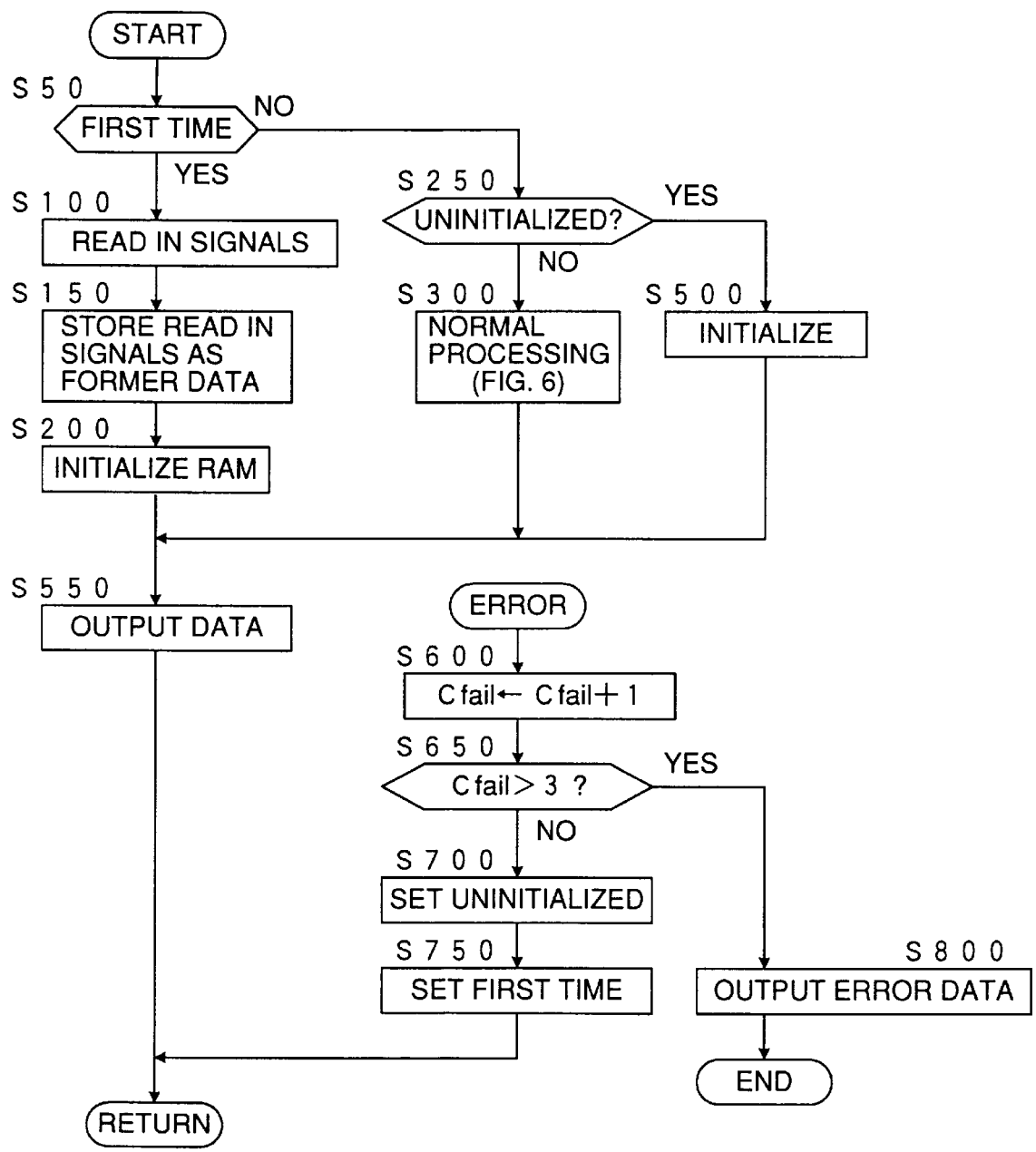
FIG. 5 is a flowchart showing the overall operation of the above-mentioned embodiment.

Referring to FIG. 5 showing a basic routine of the operation of the device shown in FIGS. 1, 2 and 3, when the device is put into operation by a closure of an ignition switch of a vehicle (both not shown), in step 50 it is judged if the control arrived at this step for the first time. At a first arrival the answer is yes, and the control proceeds to step 100, and signals are read in from the light receivers 22, 26 and 30. The in step 150, the read-in signals are stored in the particular area of the random access memory of the microcomputer 34 as former data. Those data are used as provisional starting data in the control calculations described in detail hereinbelow. Then in step 200, the random access memory is initialized except the above-mentioned particular area. Then the control proceeds to step 550, to output no substantially useful output data in the first control pass, and then the control returns to step 50.

In the second arrival at step 50 by return, the control now proceeds to step 250, and it is judged if the device is uninitialized. At a first arrival at this step after the closure of the ignition switch, or after the control has once passed through step 700 as described in detail hereinbelow, the answer of step 250 is yes, then the control proceeds to step 500, and the device is initialized so that the device is ready for a new operation. Thereafter, the control returns through step 550 again to step 50. Then the control again proceeds to step 250, and this time the control proceeds to step 300, to execute a normal processing such as illustrated in FIG. 6.

Figure 6:
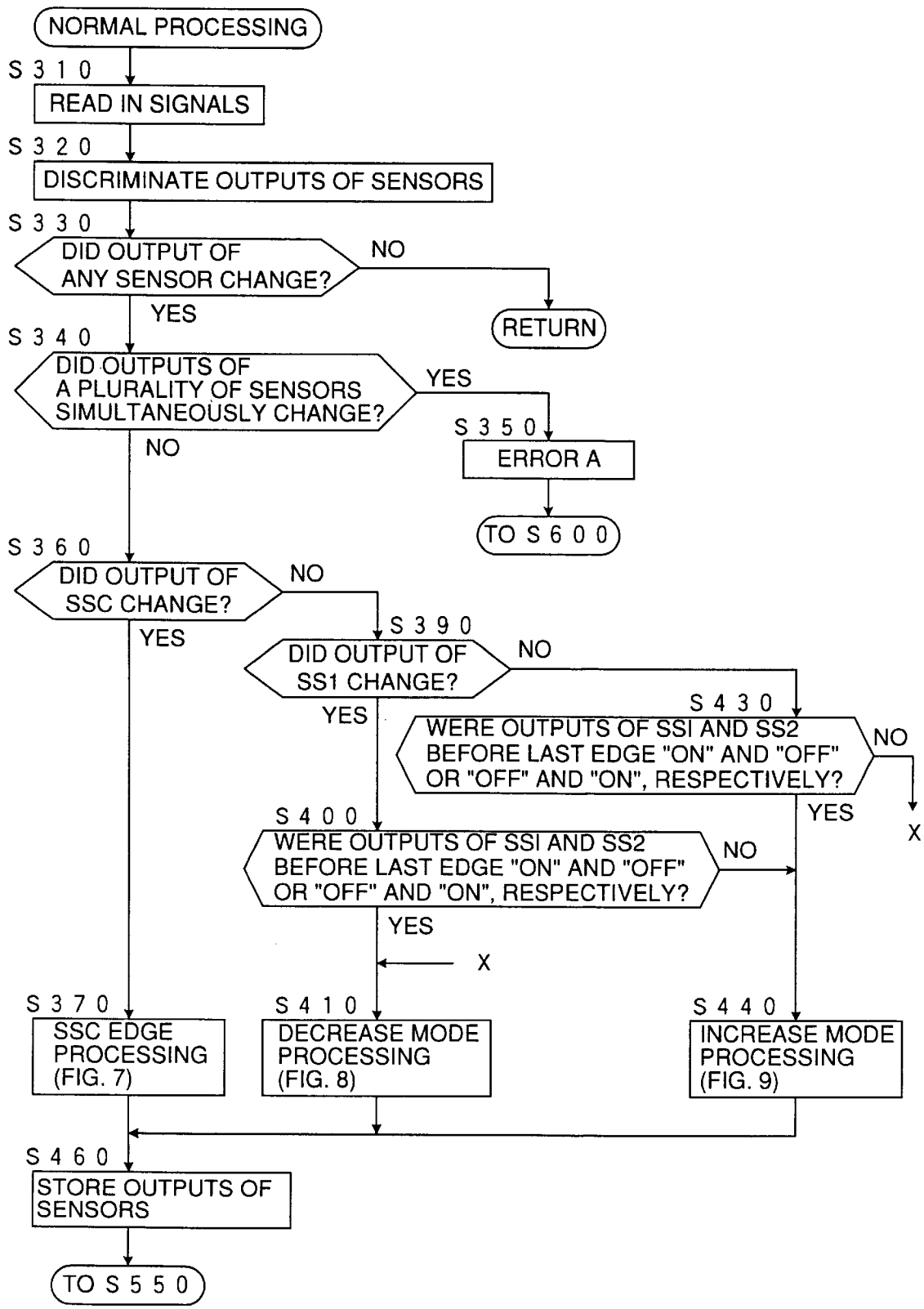
FIG. 6 is a flowchart showing a subroutine executed in step 300 of the flowchart of FIG. 5.

Referring to FIG. 6 showing a flowchart of the processes executed in the normal operation of the device, in step 310 signals are read in from the light receivers 22, 26 and 30.

In step 320, the outputs of the light receivers 22, 26 and 30, i.e. outputs of the sensors SSC, SS1 and SS2, are discriminated to be "on" or "off" as shown in FIG. 3. As described above, the outputs of the light receivers 22, 26 and 30 are not so regular as illustrated in FIG. 3 but are often ambiguous between "on" and "off", as the amount of light received by each of the light receivers inherently changes gradually as a radial edge of each one of the notches 12 or the holes 16 traverses the front of the light receivers 22, 26 or 30, while the notches 12 and the holes 16 are liable to a partial closing by a mist of oil or dust. Further, as described above the performances of the light emitting diodes or photo transistors are often liable to electrical noises.

In step 330, it is judged if the output of any sensor did change. If none of the outputs of the sensors has changed, the answer is no, and the control returns to step 50 of the flowchart of FIG. 5. Such a re-circulation is continued at a cycle time such as tens of microseconds as usual in this kind of microcomputer controlled device. When the radial edge of either of the notches 12 or the holes 16 traverses the corresponding sensor SSC, SS1 or SS2, it is detected in step 340, with a simultaneous judgment if more than one outputs of the sensors did simultaneously change. As will be appreciated from the arrangement of the notches 12 and the holes 16 in the shutter disk 10 shown in FIG. 1, a plurality of outputs should never change simultaneously as long as the device is normally operating. Therefore, if such a phenomenon occurred, the control is diverted to step 350, to identify such an error as error A. In this case, the control proceeds to step 600 of FIG. 5.

As described in detail hereinbelow, there are other errors such as errors A–K. When the control proceeds to step 600 due to one of those errors, a fail count Cfail is incremented by 1. Then in step 650, it is judged if the fail count Cfail is larger than 3. If the answer is no, the control proceeds to step 700, and the device is set with a flag "uninitialized". Then in step 750, the device is also set with a flag "first time". Then the control returns to step 50. Therefore, when any one of the errors A–K has occurred, the device is always initialized through step 500, and returned for further operation. Further, when any such error has occurred four times, the fail count Cfail reaches 4, and the control proceeds to step 800. In step 800, the error data are output, and the device is stopped.

Returning to FIG. 6, when the answer of step 340 is no, the control proceeds to step 360, and it is judged if the change of the output occurred in the sensor SSC. If the answer is yes, the control proceeds to step 370. If the answer of step 360 is no, the control proceeds to step 390, and it is judged if the change of the output occurred in the sensor SS1, and if the answer is yes, the control proceeds to step 400, while if the answer is no, the control proceeds to step 430, thus determining which of the sensors SSC, SS1 and SS2 has detected one of the radial edges of the notches 12 or the holes 16.

Figure 7:
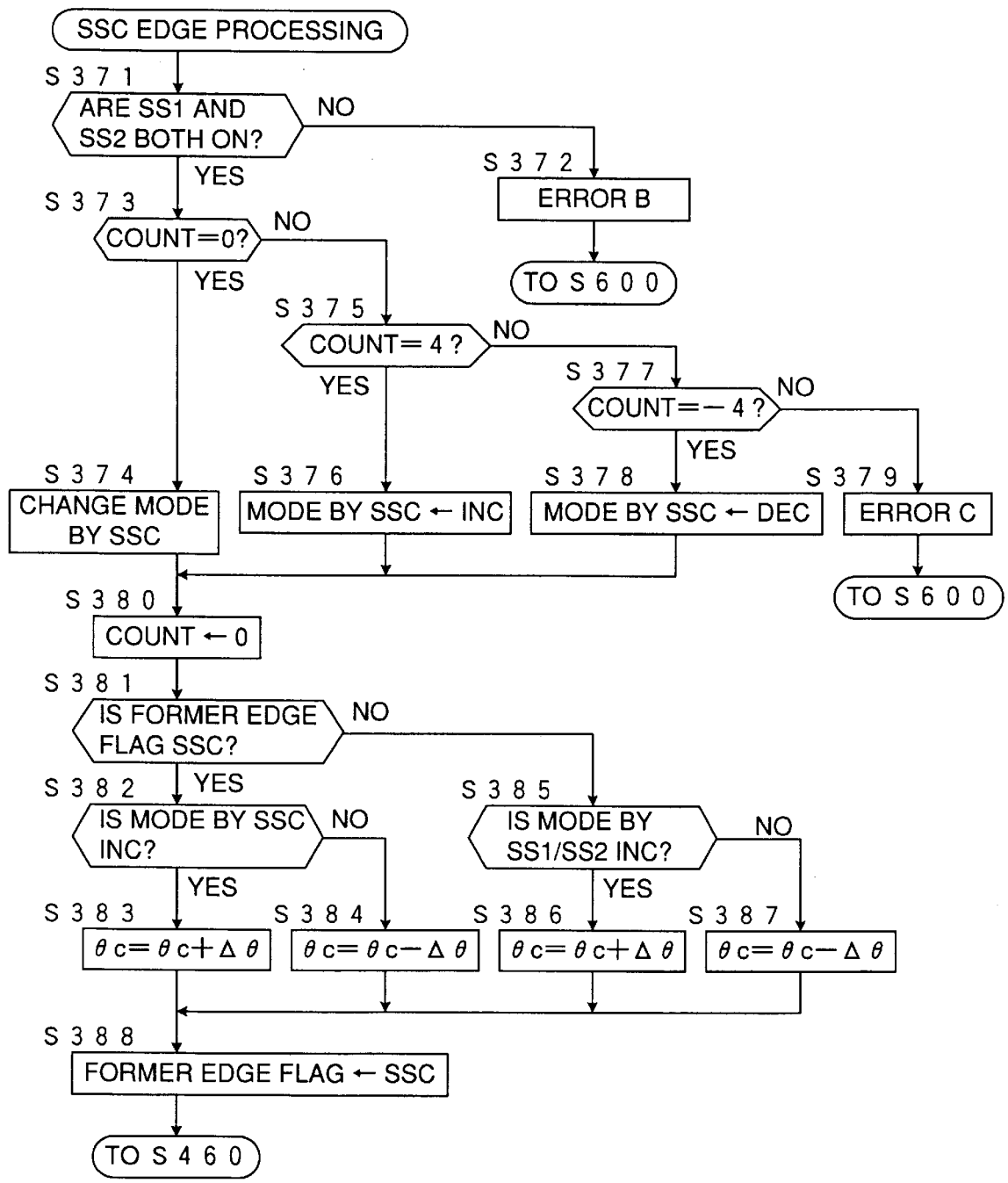
FIG. 7 is a flowchart showing a subroutine executed in step 370 of the flowchart of FIG. 6.

When the control has proceeded to step 370, i.e. when it was the sensor SSC which was traversed by the one radial edge, an SSC edge processing control such as shown in FIG. 7 is executed. The control executed according to the flowchart of FIG. 7 will be described by also referring to FIG. 10, assuming that the shutter disk 10 is rotating counter-clockwise and the moment is at position "b" of FIG. 10.

In step 371, it is judged if the outputs of the sensors SS1 and SS2 are both "on". As will be apparent from the on-off diagrams of FIG. 10 which are the same as those of FIG. 3, at edge positions of the output of the sensor SSC such as positions b, g, l and q the outputs of the sensors SS1 and SS2 are always both "on" if the device is normally operating. Therefore, the answer of step 371 is normally yes, and the control proceeds to step 373. On the other had, if the answer of step 371 is no, there should be an error in at least one of the on-off pulses of the sensors SSC, SS1 and SS2. In this case, the control proceeds to step 372, and the error is identified as error B.

In step 373, it is judged if a parameter herein called "count" is 0. The count is such as shown in the bottom rank of FIG. 10. As described hereinbelow, the count is reset to 0 when an edge is detected by the sensor SSC (step 380) and is thereafter increased (S450) or decreased (S420) by 1 each time when one of the edges of the holes 16 is detected by the corresponding sensor SS1 or SS2, so that it reaches +4 or −4 just before the next edge of the notch 12 is detected by the sensor SSC.

Therefore, when the device is normally operating, the answer of step 373 is no, and the control proceeds to step 375. According to the conditions described above with respect to the diagram of FIG. 3 in connection with the relationship between the left turn—right turn and the shifting directions of reference positions a–r, the count gradually increases from 0 to +4 during a normal left turn, while it gradually decreases from 0 to −4, both in each span of five times of the unit angle defined by two successive edges detected by the sensor SSC. Therefore, when the device is normally operating, the answer of step 375 is yes. Then the control proceeds to step 376.

It is herein defined that the rotation angle of the shutter disk 10 increases when it is turned counter-clockwise in accordance with a left turn of the steering shaft, and decreases when the shutter disk 10 is turned clockwise in accordance with a right turn of the steering shaft. In the case of the steering system of a vehicle, the neutral position in the turning of the shutter disk 10 can be determined by other means such as a yaw rate sensor which gives a zero output when the vehicle is running straight forward or by a comparison of rotation speeds of left and right side wheels which become equal to one another when the vehicle is running straight forward. The device of the present invention measures the rotation angle of the shutter disk 10, i.e. the steering shaft connected therewith, in respect to any standard or neutral position. Therefore, when the center of rotation of the shutter disk 10 is adjusted to the neutral position of the steering system, the device of the present invention provides a positive measurement value which gradually increases in positive values as the shutter disk 10 is turned more counter-clockwise, while it provides a measurement value in a negative measurement value the absolute value of which gradually increases as the shutter disk 10 is turned more clockwise.

Therefore, there are two modes with regard to the change of the rotation angle measured by the device of the present invention according to each of the edges of the notches 12 being detected by the sensor SSC, such as an increase mode due to a left turn of the steering and a decrease mode due to a right turn of the steering. Such two modes triggered by the edge of the notches 12 being detected by the sensor SSC are shown in the fourth rank of FIG. 10, as INC and DEC, respectively. Similarly, there are two modes with regard to the change of the rotation angle measured by each of the edges of the holes 16 being detected by either of the sensors SS1 and SS2, such as an increase mode due to a left turn of the steering and a decrease mode due to a light turn of the steering. Such two modes are shown in the fifth rank of FIG. 10, as INC and DEC, respectively.

Returning to step 376 of FIG. 7, herein the mode of the sensor SSC is set to the increase mode INC, although in the present case it is already in the increase mode.

In step 380, the count is reset to 0 from +4.

Figure 8:
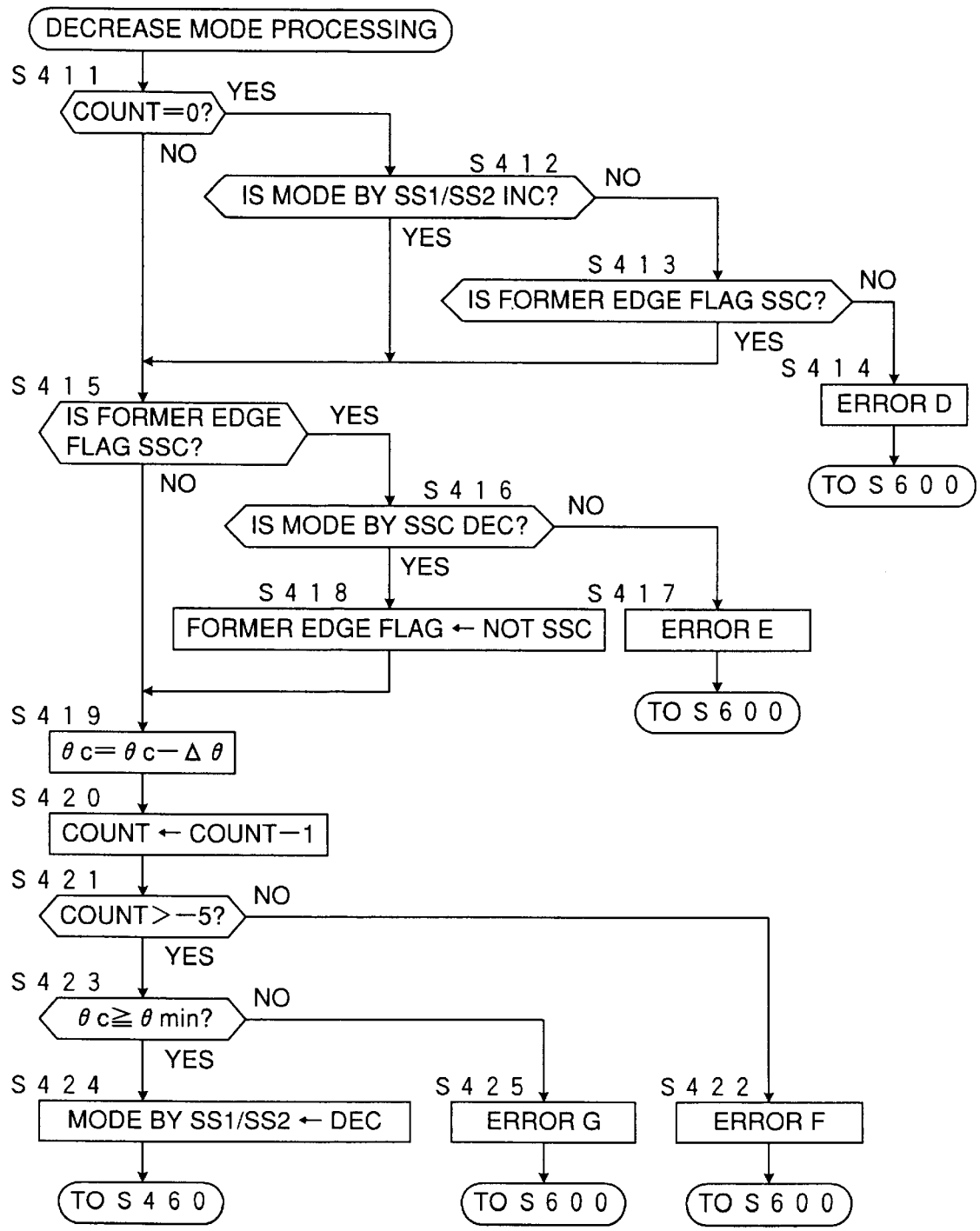
FIG. 8 is a flowchart showing a subroutine executed in step 410 of the flowchart of FIG. 6.
Figure 9:
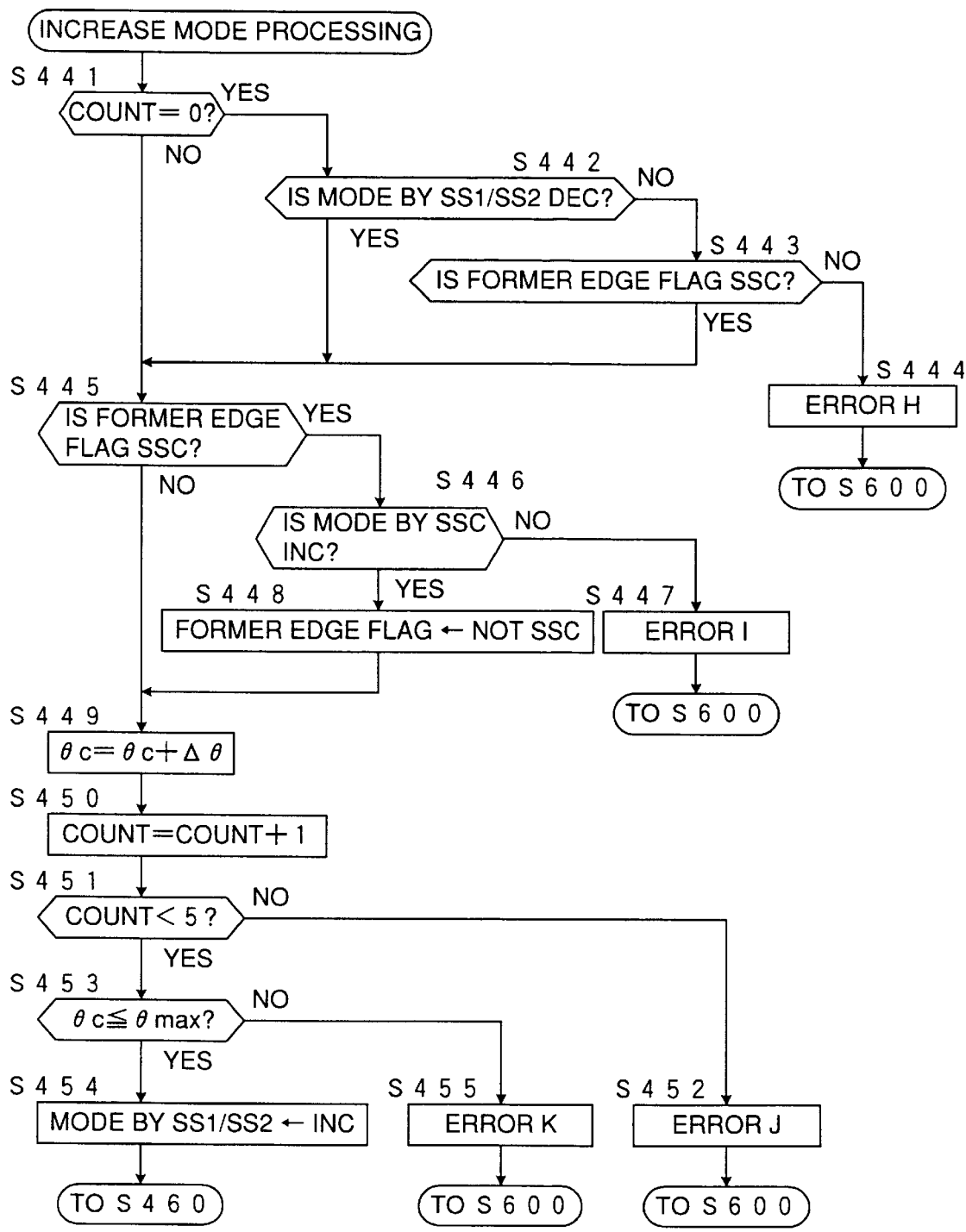
FIG. 9 is a flowchart showing a subroutine executed in step 440 of the flowchart of FIG. 6.

In step 381, it is judge if a flag called former edge flag is SSC. The former edge flag is to refer to the position of the edges of the notches 12. As will be noted later in step 388, when the processes of FIG. 7 was executed by one of the edges of the notches 12 having been traversed, the former edge flag is set to SSC. On the other hand, when a decrease mode processing or an increase mode processing such as shown in FIGS. 8 and 9 described hereinbelow, respectively, was executed, the former edge flag is set to NOT SSC in step 418 or 488. Therefore, as shown in sixth rank of FIG. 10, the former edge flag is set to SSC only when each one of the edges of the notches 12 was detected, until a next one of the edges of the holes 16 is detected by the sensor SS1 or SS2.

Therefore, in step 381 the answer is still no, and the control proceeds to step 385. In step 385, it is judged if the mode last triggered by the sensor SS1 or SS2 is the increase mode. In the present case of a left turn, it is normally constantly in the increase mode. Therefore, the control proceeds to step 386, and the measurement value θc of the rotation angle of the shutter disk 10 is increased by one unit angle Δθ. Then, in step 388, the former edge flag is set to SSC, as will be confirmed in FIG. 10, until the flag is returned to NOT SSC at the next position "c". Then the control proceeds to step 460 of FIG. 6. The paths of steps 382, 383 and 384 are provided for a probable irregular case that, although the mode to be triggered by the sensor SSC is correct, an error occurred in the former edge flag such that it is made SSC when the control proceeded to step 282.

In step 460, the outputs of the sensors are stored, and the control proceeds to step 550 of FIG. 5.

While the shutter disk 10 is being further rotated in the counterclockwise direction until the edge of one of the holes 16 at position "c" is detected by the sensor SS1, the control circulates through steps 50, 250, 300, 310, 320 and 330 to return to step 50, and when the edge of position "c" was detected, the control proceeds through step 340 to step 360. In this case, the judgement of step 360 is no, and then the control proceeds to step 390. The answer of step 390 is yes, and therefore the control proceeds to step 400. In step 400, it is judged if the outputs of the sensors SS1 and SS2 before the last edge, i.e. the edge at position "c", were "on" and "off" or "off" and "on", respectively. The answer is no, because the outputs of the sensors SS1 and SS2 are both "on" in the angle region between positions "b" and "c". Therefore, the control proceeds to step 440, and the increase mode processing shown in FIG. 9 is executed.

Referring to FIG. 9, in step 441, it is judged if the count is 0. As will be confirmed in the bottom rank of FIG. 10, the count is still 0 as reset to 0 at position "b" by step of 380 of FIG. 7. Therefore, the answer is yes, and the control proceeds to step 442, and it is judged if the mode of the sensor SS1 or SS2 is the decrease mode DEC. When the device is normally operating for the left turn, the mode triggered by the sensor SS1 or SS2 is the increase mode INC set at the end of each previous execution of this increase mode processing, as shown in step 454 described later. Therefore, the judgement of step 442 is no, and the control proceeds to step 443.

In step 443, it is judge if the former edge flag is set at SSC. The former edge flag was set to SSC at the end of the SSC edge processing executed at position "b". Therefore, the answer of step 443 is yes, and the control proceeds to step 445. In step 445, it is again judged if the former edge flag is SSC. The answer is yes, and the control proceeds to step 446. In step 44G, it is judged if the mode by SSC is in the increase mode. The mode of SSC is certainly the increase mode set in step 376 of the preceding execution of the SSC edge processing of FIG. 7. Therefore, the answer is yes, and the control proceeds to step 448, and herein the former edge flag is set to NOT SSC. Then the control proceeds to step 449.

In step 449, the measurement value θc of the rotation angle of the shutter disk 10 is increased by one unit angle Δθ. Then in step 450, the count is increased by 1.

Then in step 451, it is judged if the count is smaller than 5. The count should be +4 at the largest, if the device is normally operating. If, however, the count had increased to 5 or more, the control proceeds to step 452, identifying an error named error J, and then the control proceeds to step 600 of FIG. 5.

In step 453, it is judged if the measurement value θc of the rotation angle of the shutter disk 10 was so increased as to be larger than θmax, a predetermined maximum value allowable for the normal operation of the device. When the answer is yes, the control proceeds to step 454, and the mode triggered by the sensor SS1 or SS2 is set to the increase mode INC. Then the control proceeds to step 460 of FIG. 6. However, if in step 453 the answer is no, the control proceeds to step 455, to identify an error named error K, and then to proceed to step 600.

After once passing through step 454, for the time being while the shutter disk 10 rotates in the counter-clockwise direction within the unit angle, the control again circulates through steps 50, 250, 300, 310, 320 and 330 to return to step 50. When the shutter disk 10 further rotates in the same direction so far that one of the edges of the holes 16 corresponding to position "d" is detected by the second sensor SS2, the control along the flowchart of FIG. 6 proceeds through step 340 to step 360, and then the control further proceeds through steps 390 to step 430. In step 430, it is judged if the outputs of the sensors SS1 and SS2 before the last edge, i.e. before the edge of position "d", were "on" and "off" or "off" and "on", respectively. Since the output of the sensor SS1 in the angle region between positions "c" and "d" is "off", while the output of the sensor SS2 in the same angle region is "on", the answer of step 430 is yes, and then the control proceeds to step 440, so that the processes of the increase mode processing of FIG. 9 are again executed.

Then, again in step 441, it is judged if the count is 0. The count is now 1, and therefore the control proceeds directly to step 445, and it is judged if the former edge flag is SSC. At position "d", the former edge flag is already NOT SSC, and therefore the control directly proceeds to step 449. In step 449, the measurement value of θc of the rotation angle by the device is further increased by the unit angle Δθ, and then in step 450, the count is also increased by 1.

In step 451, it is judged if the count is smaller than 5, and if the answer is yes the control proceeds to step 453, whereas if the answer is no, the control proceeds to step 452, identifying error J, and then the control proceeds to step 600.

In step 453, it is judged if the measurement value θc of the rotation angle of the shutter disk 10 is not larger than the predetermined maximum value θmax. If the answer is yes, the control proceeds to step 454, and the mode triggered by the sensor SS1 or SS2 is set to the increase mode INC, and then the control proceeds to step 460 of FIG. 6. If the answer of step 453 is no, the control proceeds to step 455, identifing error K, and then the control proceeds to step 600 of FIG. 5.

Figure 10:
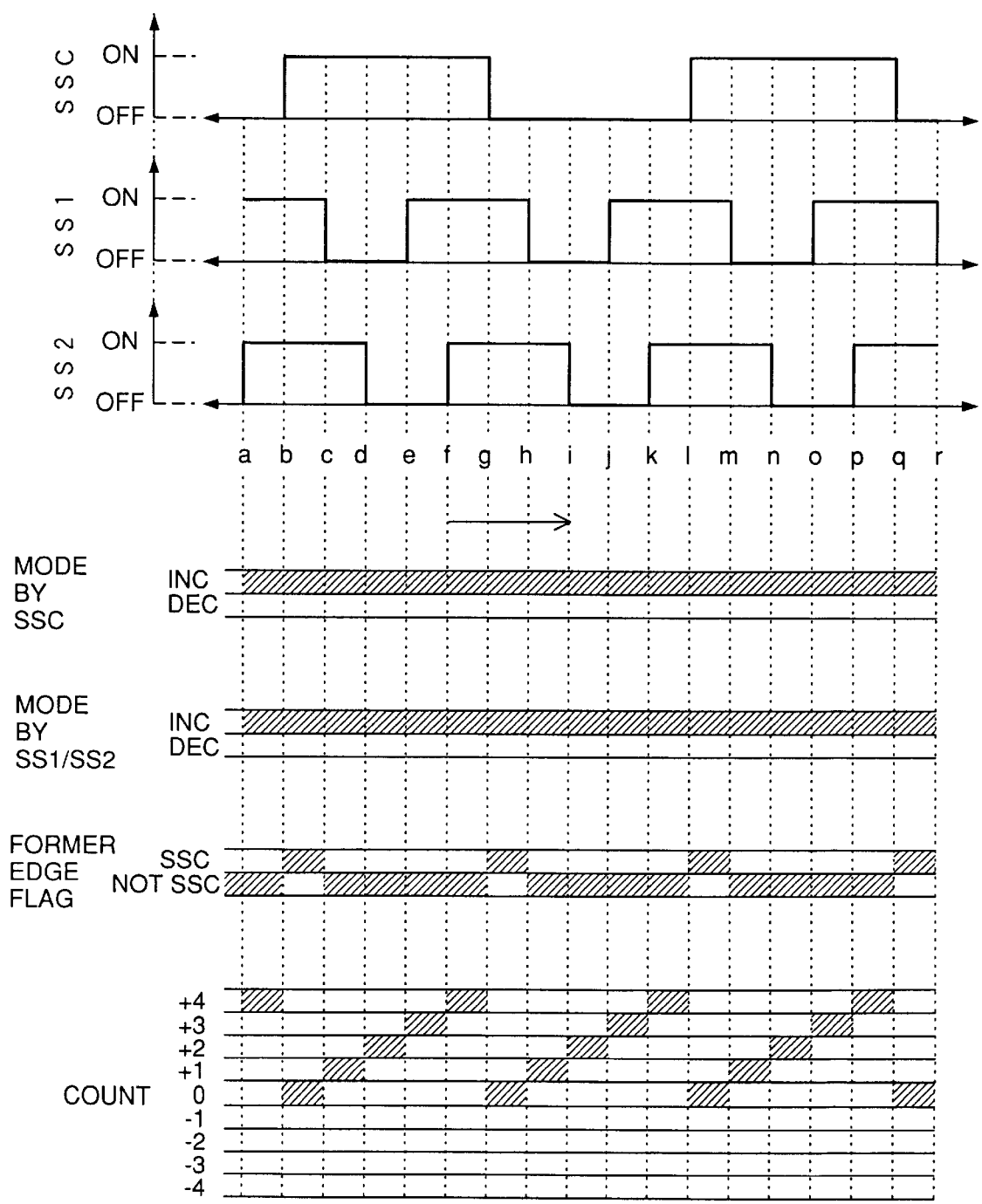
FIG. 10 is a set of synchronized diagrams showing a normal operation of the above-mentioned embodiment in a left turn of the steering shaft.

Then, for the time being, the control again circulates through steps 50, 250, 300, 310, 320 and 330 to return to step 50. Then, when the shutter disk 10 continues to rotate counter-clockwise so far that one of the edges of the holes 16 corresponding to position "e" of FIG. 10 is detected by the sensor SS1, the control proceeds again through step 340 to step 360 of FIG. 6, and then the control further proceeds through steps 390 and 400 to step 440, so that the increase mode processing of FIG. 9 is again executed. The control processes triggered at position "e" are the same as those triggered at position "c", resulting in a further increase of the measurement value θc by one more unit angle Δθ with a further increase of the count by 1.

Similarly, when one of the edges of the holes 16 corresponding to position "f" of FIG. 10 is detected by the sensor SS2, the control along FIG. 6 proceeds through steps 340, 360, 390 and 430 to step 440, and the control processes of FIG. 9 are executed in the same way, again resulting in a further increase of the measurement value θc by one unit angle Δθ and a further increase of the count by 1, so that the count now reaches +4.

After a further counter-clockwise rotation of the shutter disk 10 for the unit angle Δθ, one of the edges of the notches 12 corresponding to position "g" of FIG. 10 is detected by the sensor SSC, and the control of the flowchart of FIG. 6 again proceeds through steps 340 and 360 to step 370. Then the controls according to the flowchart of FIG. 7 is again executed. As already described with respect to position "b" of FIG. 10, the control by FIG. 7 proceeds through steps 371, 373, 375, 376, 380, 381, 385 and 386 to step 388, and then to step 460 of FIG. 6, resulting in the setting of the former edge flag to SSC and a reset of the count to 0.

Such a cycle by the five times of the unit angle Δθ is repeated as long as the shutter disk 10 is rotated in the counter-clockwise direction.

Figure 11:
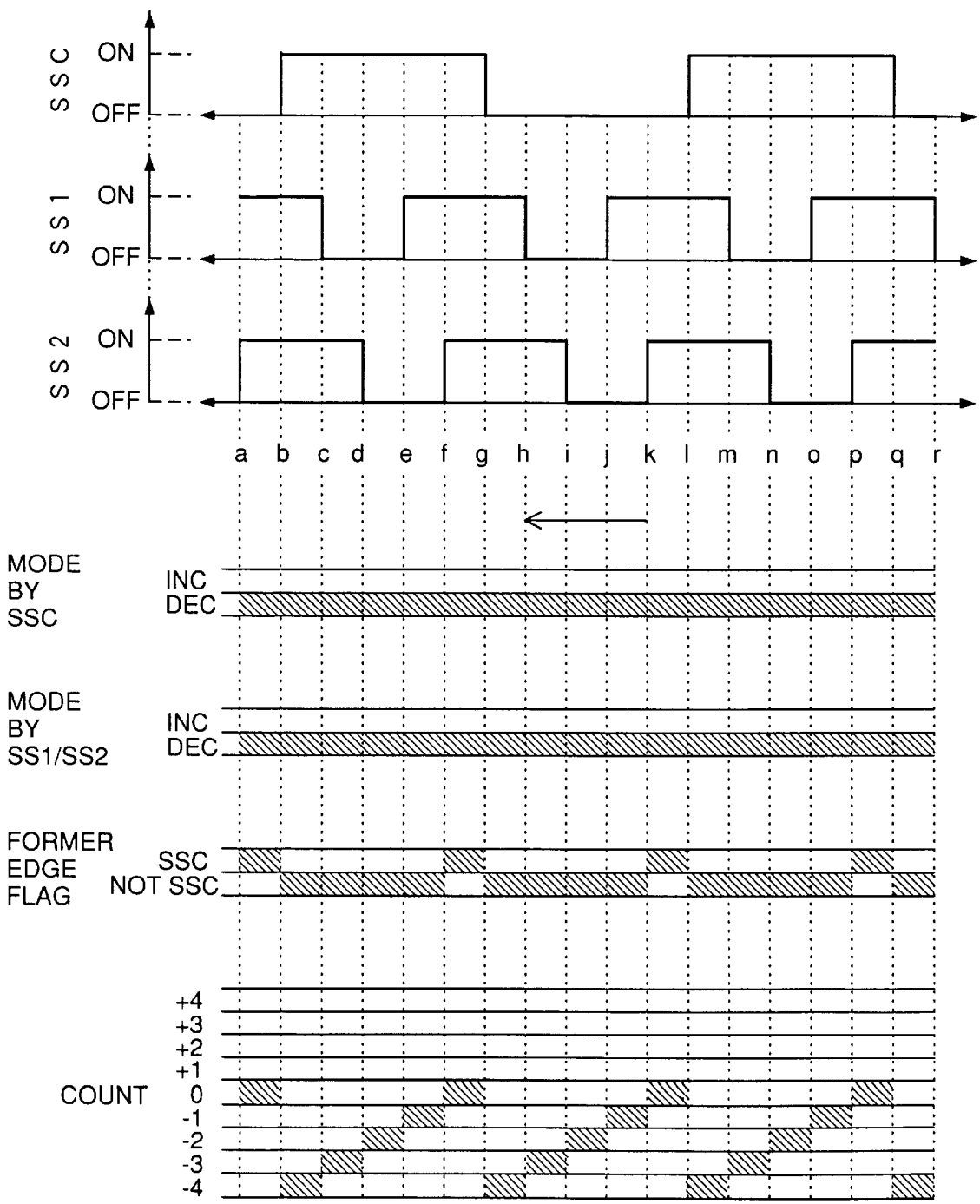
FIG. 11 is a set of diagrams similar to FIG. 10, showing a normal operation of the above-mentioned embodiment in a right turn of the steeling shaft.

When the shutter disk 10 is rotated in the clockwise direction according to a light turn of the steering shaft, the diagrams of the outputs of the sensors SSC, SS1 and SS2, the mode by the sensor SSC, the mode by the sensor SS1/SS2, the former edge flag and the count change are to be scanned from right to left, i.e. from position "r" toward position "a" in FIG. 11.

In more detail, assuming that the states of the shutter disk 10 and the sensors SSC, SS1 and SS2 shown in FIG. 1 correspond to position "l" of FIG. 11 during its clockwise rotation, the control according to the flowchart of FIG. 6 proceeds through steps 310 to 360 and to step 370, and then, in the flowchart of FIG. 7, if the device is normally operating, the control proceeds from step 373 to step 375, and then to step 377. Since the count in the right turn mode, i.e. during a clockwise rotation of the shutter disk 10, the count is decreased to −4 just before position "l", i.e. one of the edges of the notches 12, is detected by the sensor SSC. Therefore, the answer of step 377 is yes, and the control proceeds to step 378, and the mode triggered by the sensor SSC is set to a decrease mode DEC (indeed, already set at DEC, when the shutter disk 10 was being rotated clockwise). Then the control proceeds to step 380, and the count is reset to 0. Although the control which proceeded to step 374 from a "no" judgment in step 373, after having passed through step 371, generally proceeds to step 376 from step 375 or to step 378 from step 377, an error could occur in the count by certain noises. Therefore, when the judgment in step 377 is still no, the control proceeds to step 379, and such an error is identified as error C.

In step 381, it is judged if the former edge flag is SSC. In this right turn mode, the former edge flag is also set to SSC only in an angular region of one unit angle succeeding to each one of the edges of the notches 12. Therefore, the answer of step 381 is no, and the control proceeds to step 385. As described hereinbelow in the controls through the decrease mode processing shown in FIG. 8, the mode triggered by the sensor SS1 or SS2 is set to a decrease mode DEC in its step 424. Therefore, when the control proceeded to step 385 during a normal right turn operation, the answer of step 385 is no, so that the control proceeds to step 387, and the measurement value θc of the rotation angle is decreased by unit angle Δθ. Then the control proceeds to step 388, and the former edge flag is set to SSC.

During a further clockwise rotation of the shutter disk 10 until one of the edges of the holes 16 corresponding to position "k" of FIG. 11 is detected by the sensor SS2, the control according to the flowchart of FIG. 6 circulates through steps 310, 320 and 330 to return to step 50 of FIG. 5. And when, the edge of the hole 16 corresponding to position "k" was detected by the sensor SS2, the control by the flowchart of FIG. 6 proceeds through steps 310–360 to step 390, and further to step 430.

Since the outputs of the sensors SS1 and SS2 before the last edge, i.e. the edge of position "k", are both on, the judgement of step 430 is no, so that the control proceeds to step 410. Then, the decrease mode processing of FIG. 8 is executed. In step 411 of FIG. 8, it is judged if the count is 0. As will be confirmed by the illustration of the rank of count of FIG. 11, the count was reset when the controls of FIG. 7 were executed just before. Therefore, the answer of step 411 is yes, and the control proceeds to step 412. In step 412, it is judged if the mode by the sensor SS1 or SS2, i.e. the mode triggered by the edge of the sensor SS1 or SS2, is an increase mode INC. As will be noted in step 424 at the end of the flowchart of FIG. 8, the mode by the sensor SS1 or SS2 was set to a decrease mode DEC at the end of the control according to the flowchart of FIG. 8 executed as triggered by one of the edges of the holes 16 corresponding to position "m" when the shutter disk 10 is being continuously rotated clockwise. Therefore, the answer of step 412 is no, and the control proceeds to step 413. In step 413, it is judged if the former edge flag is SSC. As will be confirmed from the sixth rank of FIG. 11, at position "k" reached from the right side, the former edge flag set to SSC at position "l" is still maintained. Therefore, the answer of step 413 is yes, and the control proceeds to step 415 In step 415, it is again judged if the former edge flag is SSC, and since the answer is again yes, the control proceeds to step 416.

In step 416, it is judged if the mode by the sensor SSC is a decrease mode DEC. Since the mode of the sensor SSC was set to the decrease mode in step 378 of the flowchart of 7 executed at position "l", the answer of step 416 is yes, and the control proceeds to step 418, and the former edge flag is set to NOT SSC.

Then, in step 419, the measurement value θc of the rotation angle is decreased by one unit angle Δθ, and then in step 420 the count is also decreased by 1, making the count to −1, as confirmed by the last rank of FIG. 11.

In step 421, it is judged if the count is not so much decreased as being −5 not probable when the device is normally operating. When the answer is yes, the control proceeds to step 423.

In step 423, it is judged if the measurement value θc of the rotation angle to be measured is equal to or larger than a minimum limit θmin predetermined to be a normally allowable minimum value thereof. If the answer of step 423 is no, the control proceeds to step 425, identifying an error named error G, then letting the control proceed to step 600 of FIG. 5.

When the answer of step 423 is yes, the control proceeds to step 424, and the mode by the sensor SS1 or SS2 is set to a decrease mode DEC.

Therefore, as will be confirmed from the fourth, fifth and sixth ranks of FIG. 11, when the shutter disk 10 is continuously rotated clockwise, the mode triggered by the edge of the sensor SSC is constantly set to the decrease mode DEC, and the mode triggered by the edge of the sensor SS1 or SS2 is also set to the decrease mode DEC. On the other hand, the former edge flag is set to SSC only for an angle region of one unit angle just after one of the edges of the notches 12 was detected by the sensor SSC.

When the shutter disk 10 is further rotated clockwise, the control process circulates through steps 310, 320 and 330 to return to step 50 of FIG. 5, until a next one of the edges of the holes 16 corresponding to position "j" is detected by the sensor SS1. When the edge of position "j" is detected by the sensor SS1, the control by the flowchart of FIG. 6 proceeds through steps 310–360 to step 390, and then proceeds to step 400. Since the outputs of the sensors SS1 and SS2 before the last edge, i.e. the edge at position "j", were "on" and "off", respectively, the control proceeds to step 410, and the control according to the flowchart of FIG. 8 is again executed.

In this case, since the count is set already at –1, the control proceeds from step 411 directly to step 415, and since the former edge flag is already set at NOT SSC, the control again directly proceeds to step 419, and the measurement value θc of the rotation angle is decreased by one unit angle Δθ, and the count is decreased by 1, so that the count is now set to –2.

Then the count is similarly checked with respect to its normality in step 421, and it is confirmed if the measurement value θc of the rotation angle is not smaller than the minimum value θmin in step 423. Then in step 424, the mode to be triggered by the sensor SS1 or SS2 is set to the decrease mode DEC, before the control proceeds to step 460 of FIG. 6.

The same controls as those triggered at positions "k" and "j" are repeated as triggered by the edges of positions "i" and "h", respectively, so that each time the count is decreased by 1, so that the count is –4 when the edges of the notches 12 corresponding to position "g" is detected by the sensor SSC. Then, upon detection of the edge of position "g", the control described with respect to the edge corresponding to "q" are executed to reset the count to 0, while setting the former edge flag to SSC.

Figure 12:
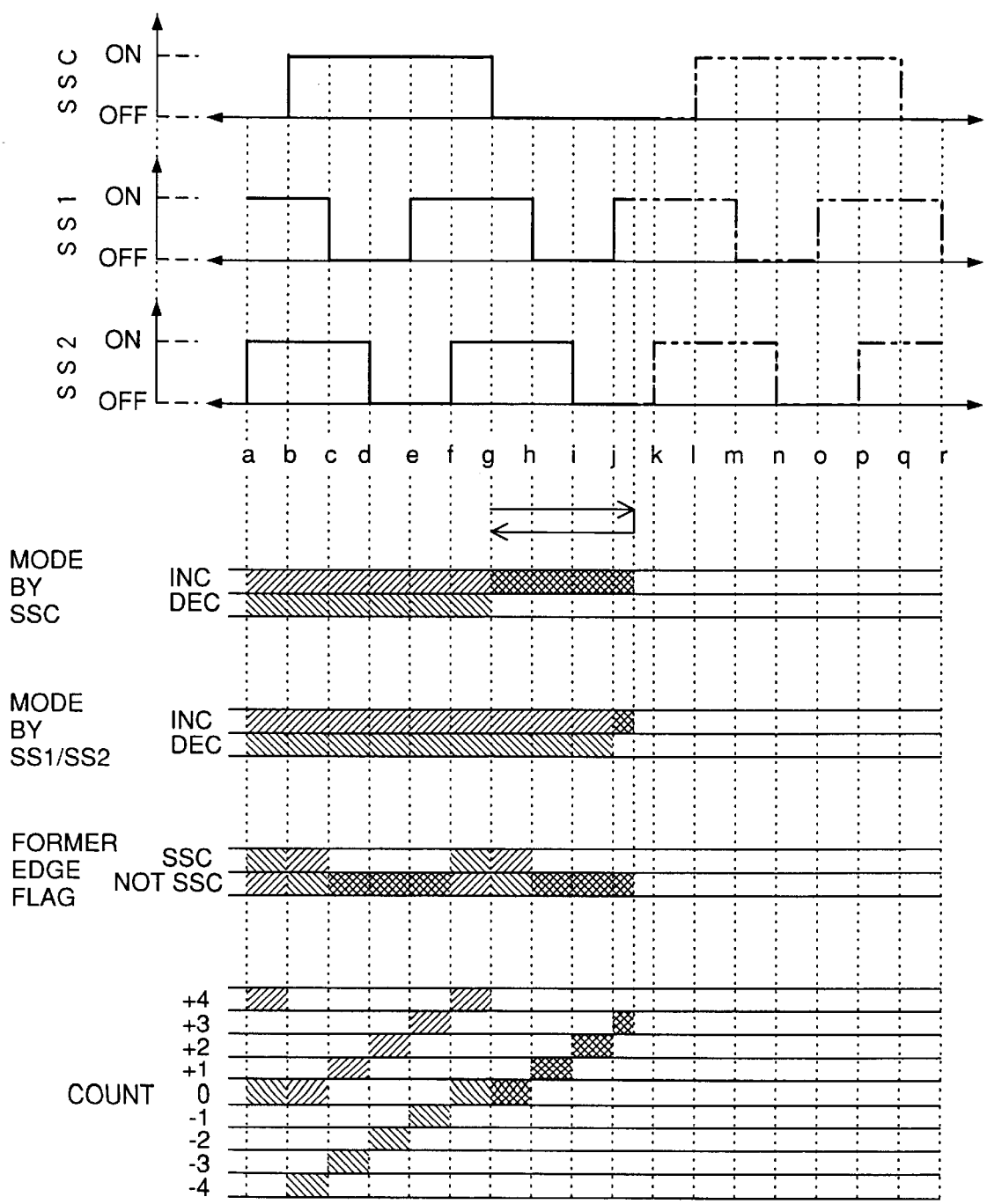
FIG. 12 is a set of diagrams similar to FIG. 10, showing a normal operation of the above-mentioned embodiment in a reversal from a left turn to a right turn of the steering shaft.

When the steering is reversed from a left turn to a right turn so that the rotation of the shutter disk 10 is reversed from a counter-clockwise rotation to a clockwise rotation at, for example, a position between positions "j" and "k" as shown in FIG. 12, the embodiment of the device of the present invention herein shown operates as follows:

When the rotation of the shutter disk 10 is reversed from a counter-clockwise rotation to a clockwise rotation when the control proceeded to a position between positions "f" and "k" as shown in FIG. 12, the edge of one of the holes 16 detected by the sensor SS1 at position "j" is again detected at position "j". During the return to position "j", the mode triggered with an edge by the sensor SSC, or the mode of SSC, is kept unchanged until one of the edges of the notches 12 corresponding to position "g" is detected by the sensor SSC, and thereafter the mode by SSC is set to the decrease mode DEC. The mode triggered with an edge by the sensor SS1 or SS2 is kept unchanged until one of the edges of the holes 16 corresponding to position "j" is detected by the sensor SS1, and thereafter the mode by SS1/SS2 is set to the decrease mode DEC. The former edge flag is kept unchanged at NOT SSC until one of the edges of the notches 12 corresponding to position "g" is detected by the sensor SSC, and then the flag is changed to SSC for an angular region between positions "g" and "f", and then the flag is returned to NOT SSC until it is again set to SSC at position "b".

Together with such the modes by SSC and SS1/SS2 and the former edge flag, the count once increased up to +3 at position "j" is decreased to +2 when the edge of one of the holes 16 corresponding to position "j" traverses the sensor SS1 from right to left, and thereafter the count is successively decreased by 1 each time when the edges of the holes 16 corresponding to positions "i" and "h" traverses the sensors SS2 and SS1, respectively, so that the count is already reduced to 0 before the sensor SSC detects the edge of one of the notches 12 corresponding to position "g", as illustrated in the bottom rank of FIG. 12.

When one of the edges of the notches 12 corresponding to position "g" is detected by the sensor SSC, the control proceeds in the flowchart of FIG. 6 from step 310 straight downward through steps 320, 330, 340 and 360 to step 370. Then the control is executed according to the flowchart of FIG. 7.

In this case, when the control has proceeded from step 371 to step 373, the count is 0, and therefore the control proceeds directly to step 374. In step 374, the mode by SSC, i.e. the mode triggered with an edge of the notches 12 by the sensor SSC is changed oppositely, i.e. from the increase mode INC to the decrease mode DEC. Then in step 380, the count is reset to 0, although in this case the count is already set at 0.

In step 381, it is judged if the former edge flag is SSC. As will be confirmed from the sixth rank of FIG. 12, the former edge flag was changed from SSC to NOT SSC at position "h" during the former left turn and is still kept at NOT SSC. Therefore, the control proceeds to step 385, and since the mode by SS1/SS2 is already set at DEC at position "j", the answer is no, and the control proceeds to step 387. Then the measurement value θc is decreased by one unit angle Δθ, and then the control proceeds to step 388, where the former edge flag is set to SSC, and then the control proceeds to step 460 of FIG. 6.

As will be noted by comparing the angular region between positions "f" and "g" of FIG. 12 with the angular region between positions "p" and "q" of FIG. 11, the operating condition of the device has now been completely set for a normal right turn, so that a further rotation of the shutter disk 10 in the clockwise direction is processed by the device in the same manner as described with respect to the normal right turn shown in FIG. 11.

As described above, the on-off pulses generated by the sensors SSC, SS1 and SS2 are liable to electrical noises, particularly when the sensors are of the semiconductor constructions such that the light emitter is made of a light emitting diode and the light receiver is made of a photo transistor, with related integral circuits. When such sensors are disturbed by electrical noises, "on" and "off" pulses generated by the sensors SSC, SS1 and SS2 are deformed typically such that the leading edge or the trailing edge between the "on" and "off" states of a pulse generated by one of the sensors SSC, SS1 and SS2 shifts beyond the leading edge or the trailing edge of an adjacent pulse generated by other of the sensors SSC, SS1 and SS2, or an additional pulse is generated between two successive pulses, so that the order of generation of the on-off pulses among the sensors SSC, SS1 and SS2 is disturbed, thereby causing an error in the measurement value θc of the rotation angle to be measured. According to the device of the present invention, such an error in the measurement of the rotation angle due to such noises is identified before the measurement proceed for an angle corresponding to five times of the unit angle.

Figure 13:
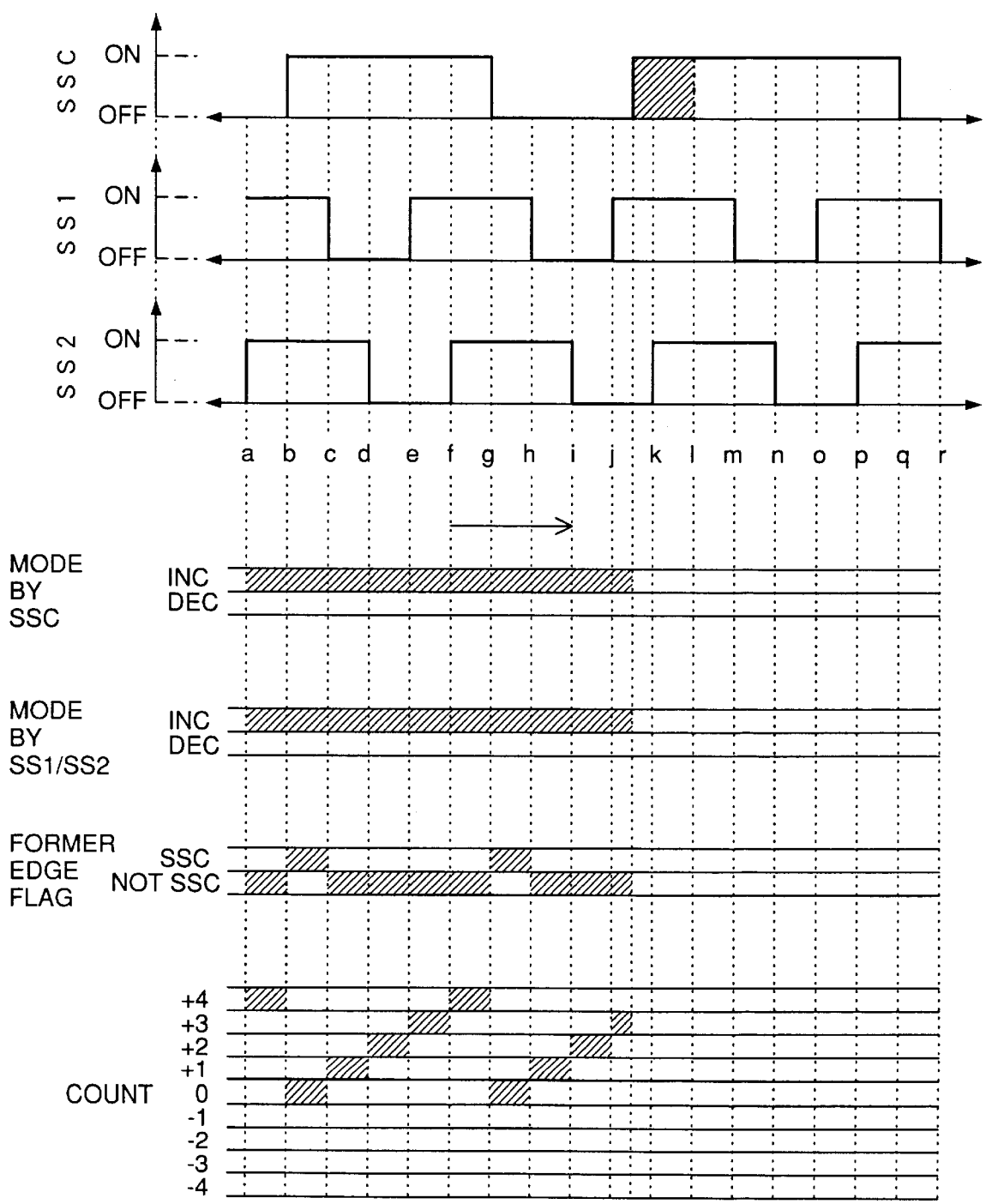
FIG. 13 is a set of diagrams similar to FIG. 10, showing an example of an operation which identifies an error named error B.
Figure 14:
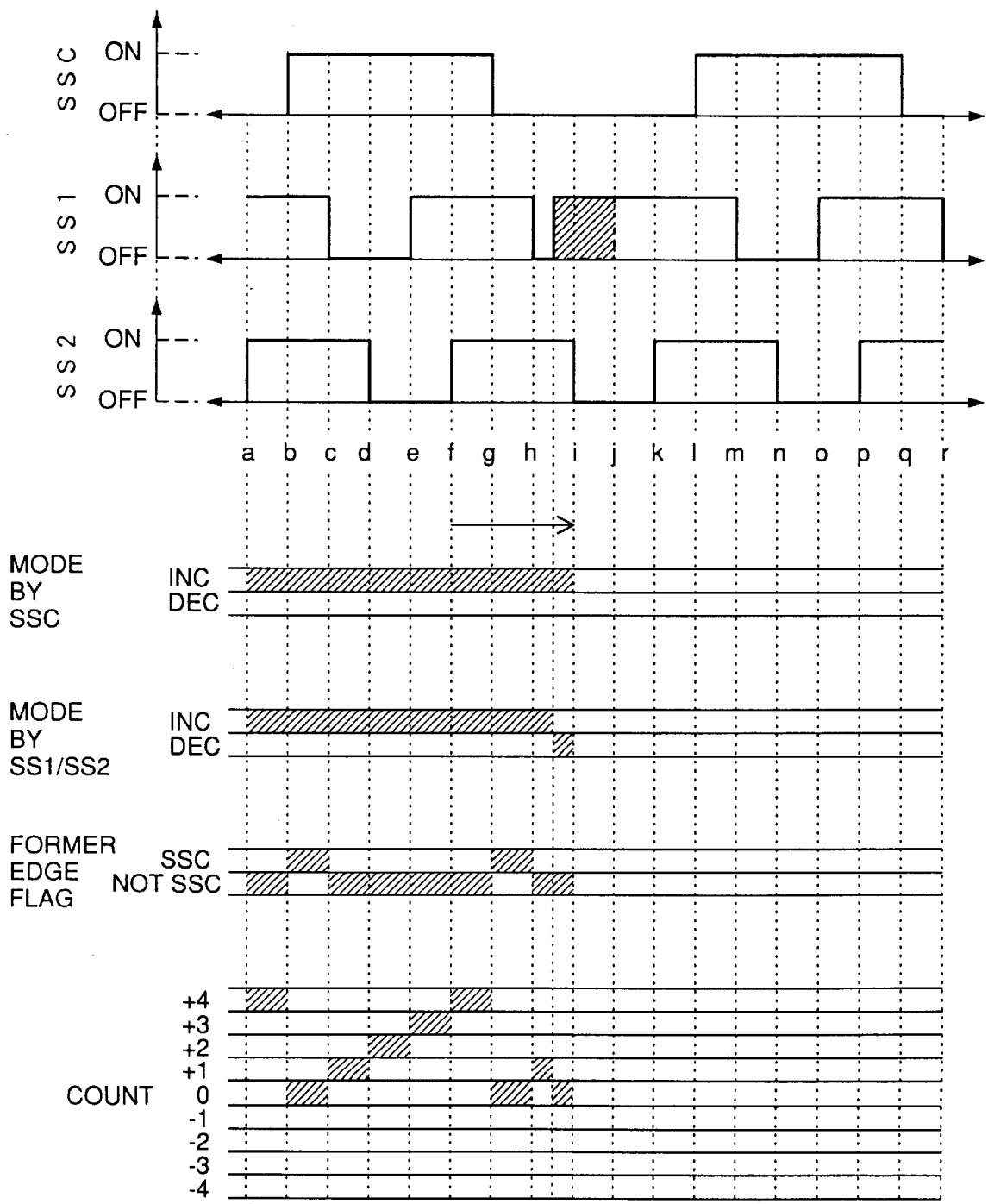
FIG. 14 is a set of diagrams similar to FIG. 10, showing an example of an operation which identifies an error named error D.

FIG. 13 shows an example that a noise occurred such that an on-edge to be generated by the sensor SSC occurred earlier than that to be generated by the sensor SS2 during a counter-clockwise rotation of the shutter disk 10, corresponding to a left turn of the steering shaft. (In the following, the direction of rotation of the shutter 10 will be expressed by the corresponding turning direction of the steeling shaft connected therewith for the brevity of description.) In this case, as shown in FIG. 13, the performances of the mode by SSC, the mode by SS1/SS2, the former edge flag and the count proceed normally according to those of the left turn shown in FIG. 10 up to position "j".

Then, when the shutter disk 10 rotates a small angle further beyond position "j", the output of the sensor SSC changes from "off" to "on". At this moment the scanning control through the flowchart of FIG. 6 proceeds through step 330 toward step 340, and then through step 360 to step 370, so that the flowchart of FIG. 7 is executed. In the flowchart of FIG. 7, in step 371 it is judged if the output of the sensors SS1 and SS2 are both on. Therefore, if such an irregularity in the on-off performance of the output of the sensor SSC has occurred at a position before the leading edge of the corresponding on-pulse by the sensor SS2, i.e. position "k", it is immediately detected by step 371, letting the control proceeds to step 372, thereby identifying the irregularity as error B. In this case, the control proceeds to step 600 of FIG. 5

When one of the on-off pulses to be generated by the sensor SS1 at position "j" has deformed by a noise at a position between positions "h" and "i" before the on-pulse generated by the sensor SS2 between positions "f" and "i" ends at position "i" as shown in FIG. 13, such an irregularity is detected as follows:

The performances of the modes by SSC and SS1/SS2, the former edge flag and the count proceed in the normal manner of left turn shown in FIG. 10 until the irregular on-pulse by the sensor SS1 occurs. When the irregular on-pulse by SS1 has occurred, in the flowchart of FIG. 6 the control proceeds from step 360 through step 390 to step 400, and the judgment is made yes. Therefore, the control proceeds to step 410, and the decrease mode processing of FIG. 8 is executed. In step 411, the answer is no, and therefore the control proceeds to step 415, wherein the answer is again no. Therefore, the control proceeds through steps 419, 420, 421, 423 and 424, provided that the answers in steps 421 and 423 are yes, so that the count is decreased by 1 and the mode by SS1/SS2 is changed to the decrease mode DEC, before the control returns. Then, soon the trailing edge of the on-pulse by the sensor SS2 ends at position i. According to this change of the output of the sensor SS2, the control in the flowchart of FIG. 6 proceeds to step 430, and the judgement is made no. Therefore, the control proceeds to step 410, and the decrease mode processing of FIG. 8 is again executed. In step 411, the count is now 0, so that the judgement is yes, and the control proceeds to step 412, and it is judged if the mode by SS1/SS2 is the increased mode INC. However, the mode by SS1/SS2 was already changed to the decrease mode DEC by the irregular leading edge of the on-pulse by the sensor SS1. Therefore, the answer of step 413 is no, and therefore the control proceeds to step 414, identifying such an error as error D. Then the control proceeds to step 600 of FIG. 5.

Figure 15:
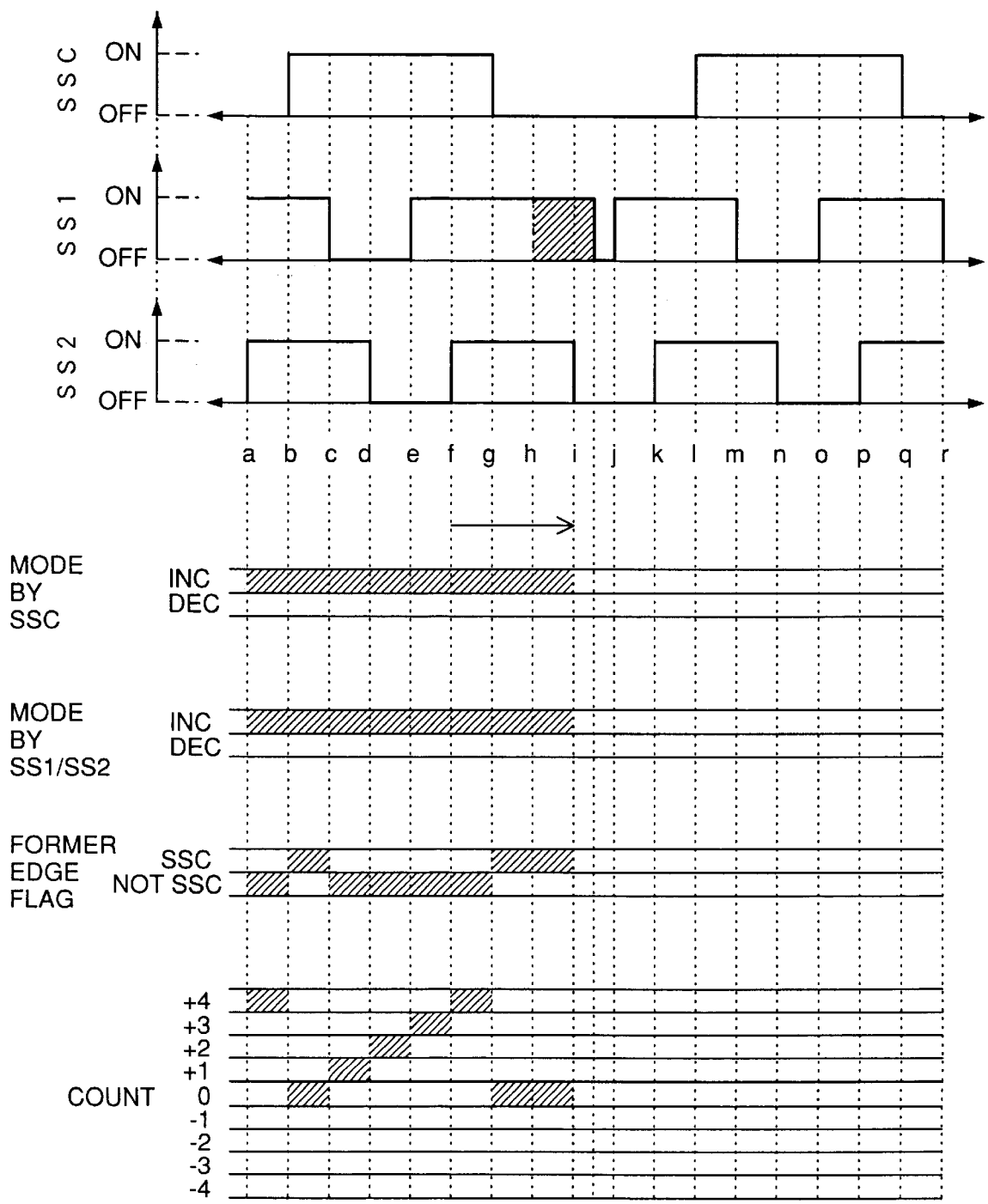
FIG. 15 is a set of diagrams similar to FIG. 10, showing an example of an operation which identifies an error named error E.

When an irregularity occurred in an on-pulse generated by the sensor SS1 as shown in FIG. 15 such that the pulse which should end at position "h" has extended to end between positions "i" and "j". In this case, the 0 count reset by step 380 of the flowchart of FIG. 7 continues until position i, with the former edge flag being also kept at SSC. Then, at position "I", the trailing edge of the on-pulse by the sensor SS2 terminates. In accordance with this, the control through the flowchart of FIG. 6 proceeds to step 430, and the judgement is made no. Then the control proceeds to step 410, and the decrease mode processing of FIG. 8 is executed. In step 411, since the count is 0, the judgement is yes and the control proceeds to step 412. Since the mode by SS1/SS2 is in the increase mode INC, the judgement of step 412 is yes, and therefore the control proceeds to step 415. The former edge flag is still SSC, and therefore the judgement of step 415 is yes, and the control proceeds to step 416. The mode by SSC is at the increase mode INC, and therefore the judgment of step 416 is no, and the control proceeds to step 417, identify such an irregularity as error E.

Figure 16:
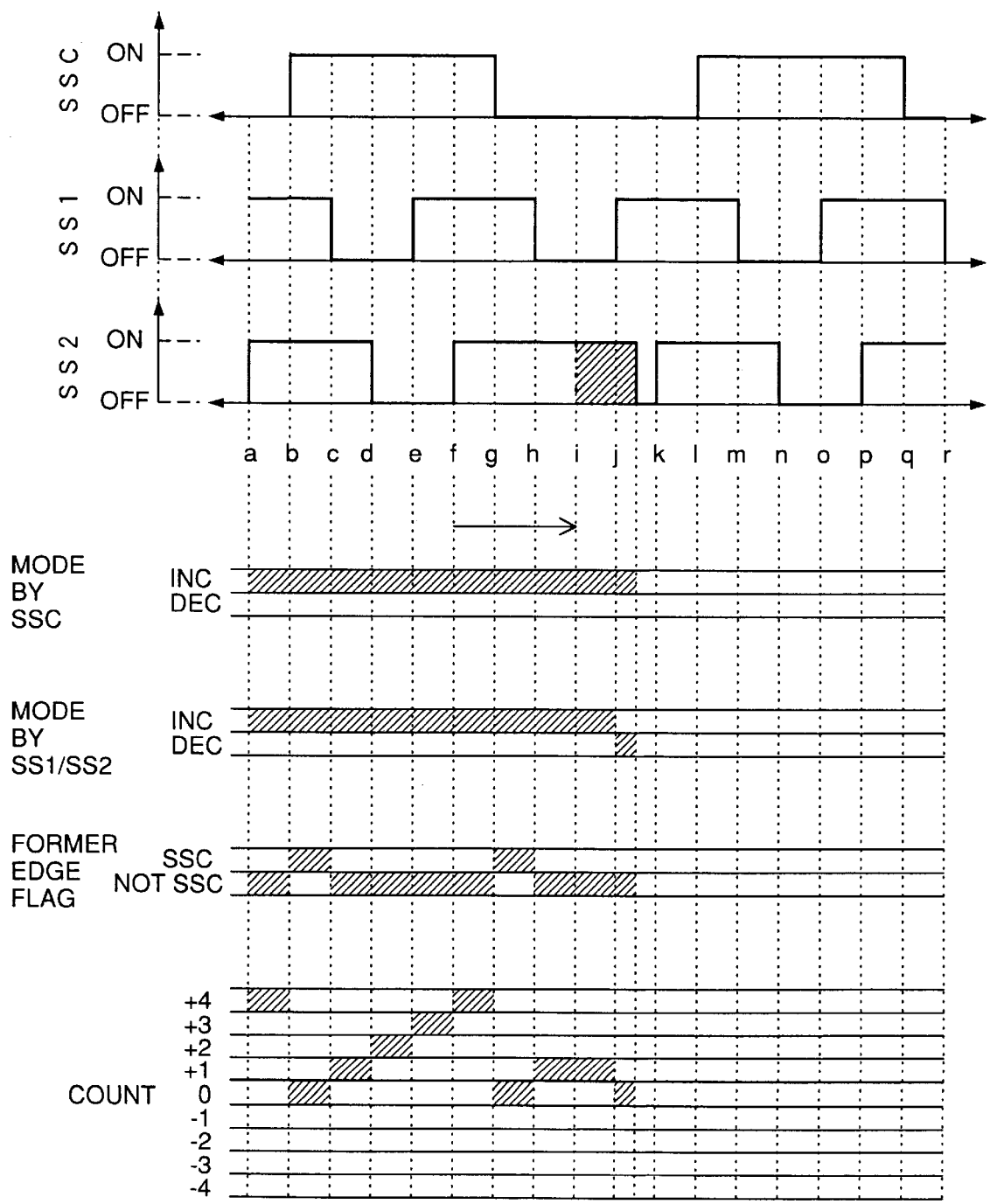
FIG. 16 is a set of diagrams similar to FIG. 10, showing an example of an operation which identifies the error named error D.

When one of the on-off pulses generated by the sensor SS2 has deformed as shown in FIG. 16 such that the trailing edge which should end at position "i" is extended to end after the leading edge of an adjacent one of the on-off pulses generated by the sensor SS1 which is detected at position "j", such an irregularity is detected as follows:

The measurement of the rotation angle during a left turn proceeds normally up to position "h". At position "h", the mode by SSC is in the increase mode INC, and the mode by SS1/SS2 is also at the increase mode INC. The former edge flag set to SSC at position "g" was returned to NOT SSC at position "h". The count was increased to +1 at position "h". When the shutter disk 10 rotates further in the counter-clockwise direction, at position "j" the leading edge of the on-pulse generated by the sensor SS1 to extend between positions "j" and "m" is detected by the sensor SS1. Upon this detection, the control in the flowchart of FIG. 6 proceeds to step 400, and the judgement of step 400 is made yes. Therefore, the control proceeds to step 410, and the decrease mode processing of FIG. 8 is executed.

In the flowchart of FIG. 8, in step 411, the answer is no, because the count is at +1, and therefore the control proceeds to step 415. The judgement of step 415 is no as will be confirmed by the sixth rank of FIG. 16. Therefore, the control proceeds through steps 419, 420, 421, 423 and 424, so that count is decreased by 1 to return to 0, while the mode by SS1/SS2 is changed to the decrease mode DEC.

When the shutter disk 10 rotates a little further so that the trailing edge of the on-pulse by the sensor SS2 extended beyond position "j" is detected by the sensor SS2, the control by the flowchart of FIG. 6 proceeds to step 430, and the judgment is made no, and therefore, the control proceeds to step 410, and again the decrease mode processing by the flowchart of FIG. 8 is executed. In step 411, the count is now 0, so that the control proceeds to step 412, and it is judged if the mode by SS1/SS2 is the increase mode INC. Since the mode by SS1/SS2 has been changed to the decrease mode DEC at position "j", the answer of step 412 is no, and the control proceeds to step 413. As is confirmed by the six rank of FIG. 15, at this stage the former edge flag is set at NOT SSC. Therefore, the judgement in step 413 is no, and the control proceeds to step 414, identifying such an irregularity as error D.

Figure 17:
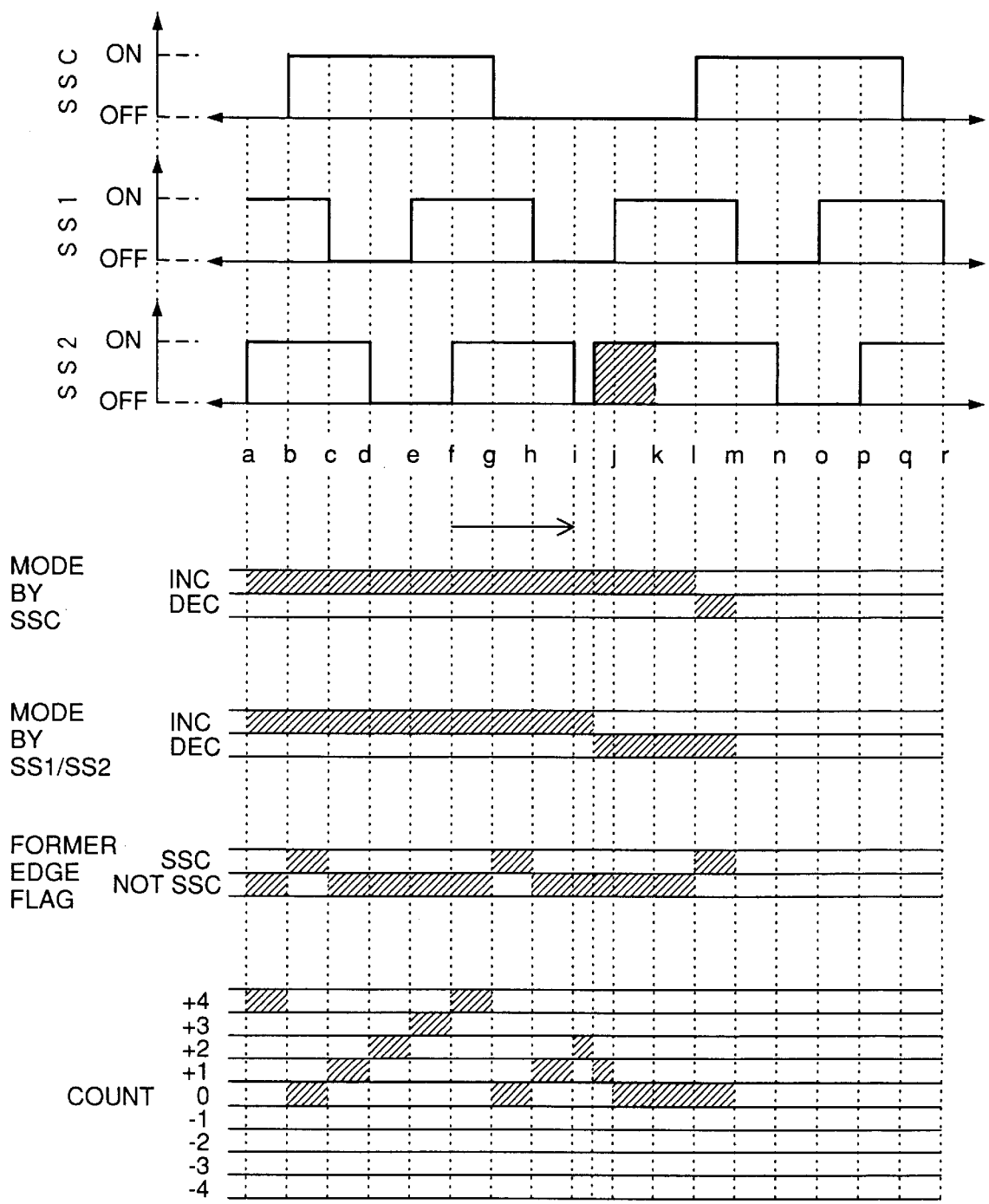
FIG. 17 is a set of diagrams similar to FIG. 10, showing an example of an operation which identifies an error named error I.

When an irregularity has occurred in one of the on-off pulses generated by the sensor SS2 as shown in FIG. 17 such that the leading edge an o-pulse which should occur at position "k" occurs in advance of the leading edge of an adjacent one of the on-off pulses generated by the sensor SS1, it is detected as follows:

The normal measurement of the rotation angle in the left turn is carried out in the same manner as shown in FIG. 10 before the leading edge of the irregularly deformed pulse is detected by the sensor SS2 at the position between positions "i" and "j". Upon the detection of the leading edge of the irregular pulse, the control by the flowchart of FIG. 6 proceeds to step 430, and the answer is no, and therefore, the control proceeds to step 410, and the decrease mode processing shown in FIG. 8 is executed. In step 411, the answer is no, because the count is already +2, and therefore the control proceeds to step 415. Since the former edge flag is set at NOT SSC, the control proceeds to step 419, and further through steps 420, 421, 423 and 424. Therefore, the count is decreased by 1, while the mode by SS1/SS2 is changed to the decrease mode DEC.

After a further small counter-clockwise rotation of the shutter disk 10, a leading edge of the on-pulse is detected by the sensor SS1 at position "j". Upon this detection, the control through the flowchart of FIG. 6 process to step 400, and the answer is yes, and therefore, the control proceeds to step 410, and again the decrease mode processing shown in FIG. 8 is executed. In step 411, since the count is +1, the control proceeds to step 415. Since the former edge flag is already NOT SSC, the judgement is no, and the control proceeds directly to step 419, and further proceeds through steps 420, 421 and 423 to step 424. Therefore, the counter is further decreased by 1, so as to become 0, and the mode by SS1/SS2 is kept to the decrease mode DEC.

If the shutter disk rotates further in the counter-clockwise direction, the leading edge of the on-off pulse generated by the sensor SSC to extend between positions "l" and "q" is detected at position "l" by the sensor SSC. Upon this detection, at position "l" the control by the flowchart of FIG. 6 proceeds through step 360 to step 370, and the control by the flowchart of FIG. 7 is executed.

When the control proceeds through step 371 to step 373, it is judged if the count is 0. As will be confirmed by the seventh rank of FIG. 17, the count is at 0. Therefore, the control proceeds to step 374, and the mode by SSC is changed from the increase mode INC to the decrease mode DEC. Thereafter, the control proceeds to step 380, resetting the count to 0 (although the count is already 0), and then to step 381, and it is judged if the former edge flag is SSC. Since the answer is no, the control proceeds to step 385. The judgement of step 385 is no, and therefore the control proceeds through step 387 to step 388, and the former edge flag is set to SSC.

When the counter-clockwise rotation of the shutter disk 10 further continues until the trailing edge of the on-pulse is detected by the sensor SS1 at position "m", and the control by the flowchart of FIG. 6 proceeds to step 400, and according to the judgement of no, control proceeds to step 440, so that the increase mode processing shown in FIG. 9 is executed. In step 441, the answer is yes, and therefore the control proceeds to step 442. Since the mode by SS1/SS2 is already at the decrease mode DEC, the answer is yes, and the control proceeds to step 445. Since the former edge flag is already set to SSC, the answer of step 445 is yes, and the control proceeds to step 446, and it is judged if the mode by SSC is the increased mode INC. As is confirmed by the fourth rank of FIG. 17, the mode by SSC is at the decrease mode DEC, and therefore the answer is no, and the control proceeds to step 447, identifying such an irregularity as error I.

Figure 18:
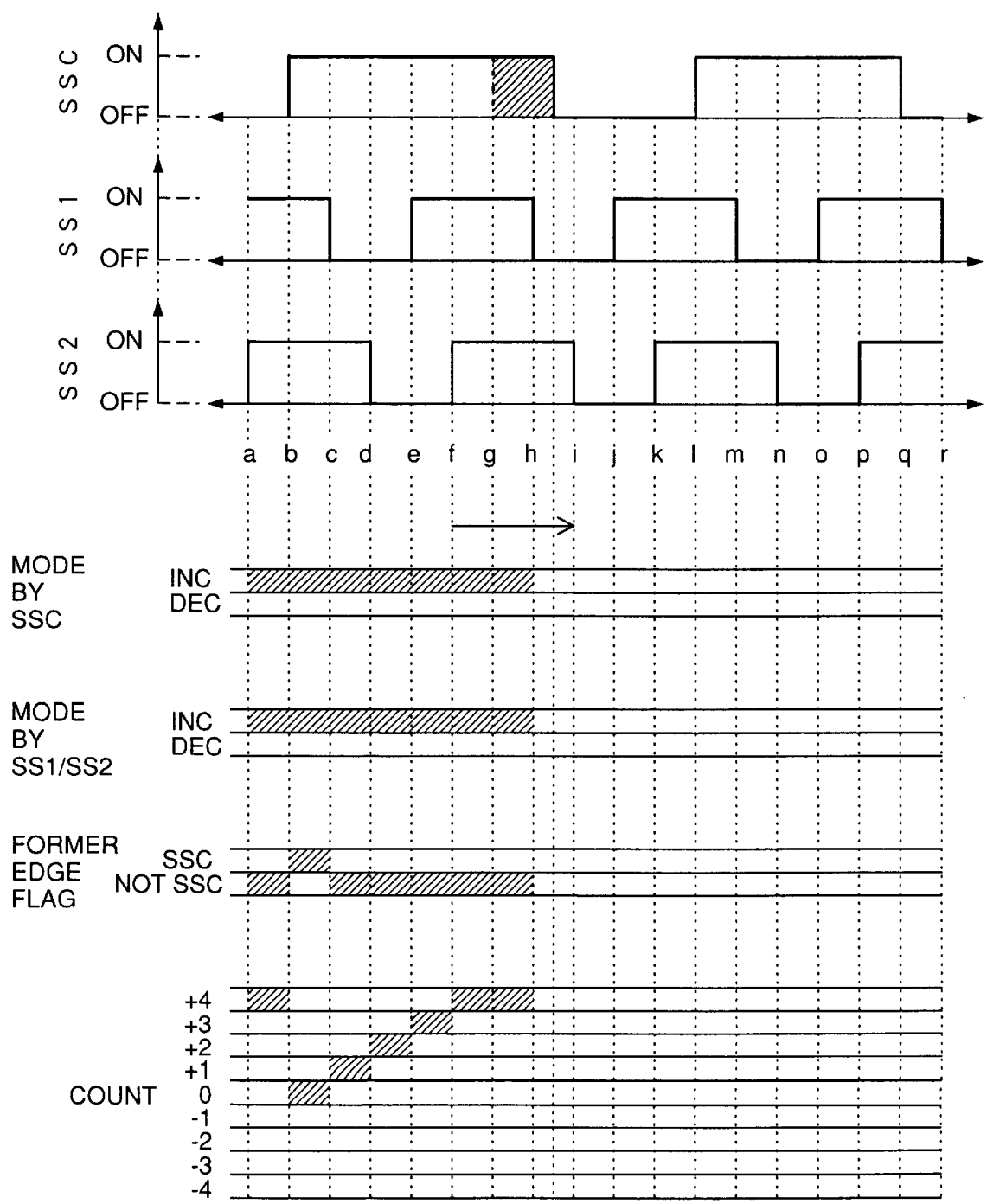
FIG. 18 is a set of diagrams similar to FIG. 10, showing an example of an operation which identifies an error named error J.

When an irregularity occurs in one of the on-off pulses generated by the sensor SSC as shown in FIG. 18 such that the trailing edge to be detected at position "g" delays beyond position "h", the conditions of the modes by SSC and SS1/SS2, the former edge flag and the count attained at position "f" are extended up to position "h". When the trailing edge of the on-pulse to terminate at position "h" is detected by the sensor SS1, the control in FIG. 6 proceeds to step 400, and since the answer of step 400 is no, the control proceeds to step 440, and the increase mode processing of FIG. 9 is executed. Since the judgement of step 441 is no, the control proceeds to step 445. The judgement of step 445 is again no, and therefore the control proceeds through step 449 to step 450, and the count is further increased by 1, so as to become +5. Therefore, in step 451, the judgement is no, and the control proceeds to step 452, identifying such an irregularity as error J.

Figure 19:
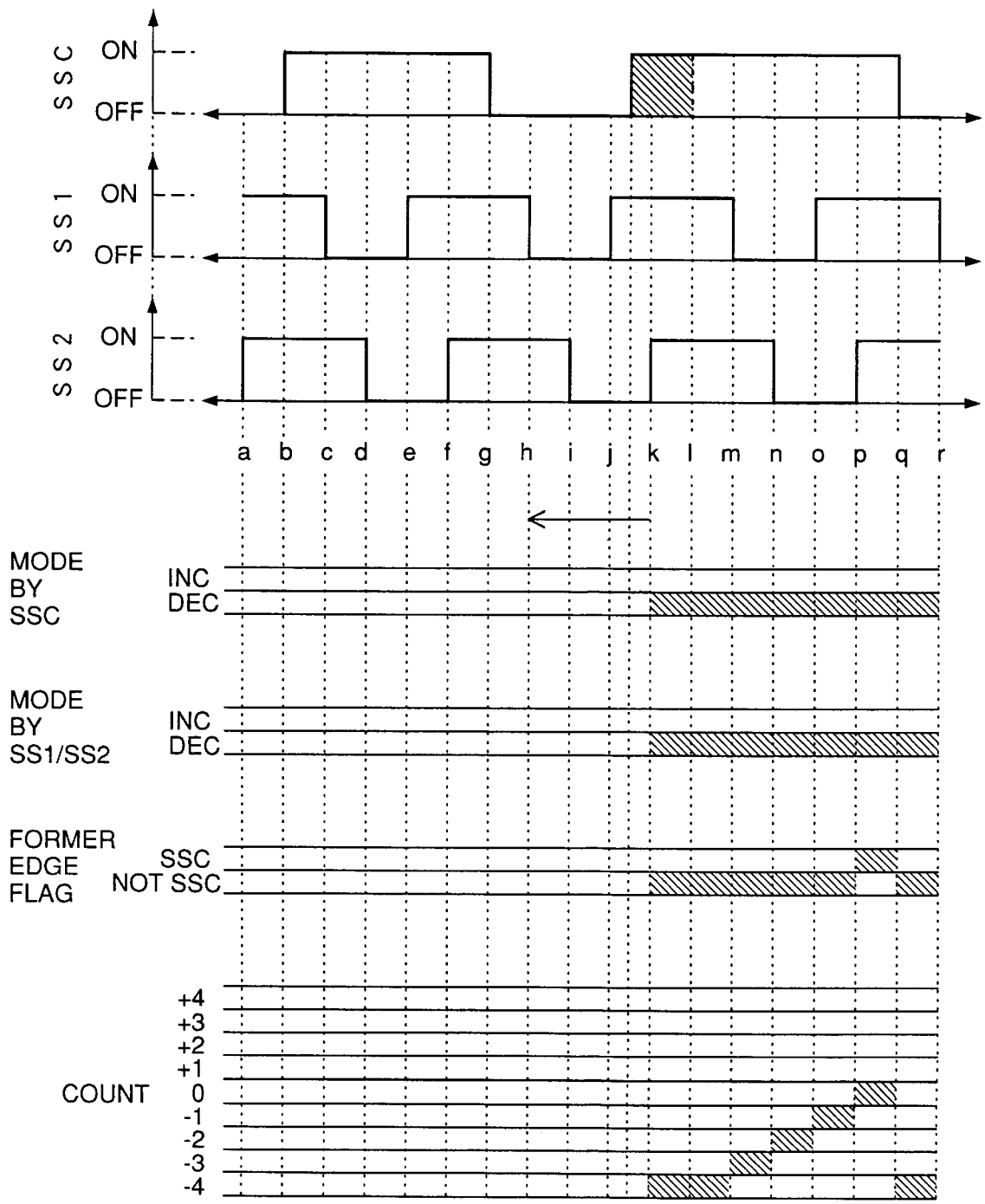
FIG. 19 is a set of diagrams similar to FIG. 10, showing an example of an operation which identifies an error named error; F

When the trailing edge of one of the on-off pulses generated by the sensor SSC during a clockwise turn of the shutter disk 10, i.e. during a right turn of the steeling shaft connected therewith, delays as shown in FIG. 19 such that the trailing edge to be detected by the sensor SSC at position "l" is not yet detected when the trailing edge at position "k" is detected by the sensor SS2, the control through the flowchart of FIG. 6 proceeds through step 430 to step 430, and since the judgement of step 430 is no, the control proceeds to step 410, and the decrease mode processing of FIG. 8 is executed. In this case, the control proceeds from step 411 directly to step 415, and since the former edge flag is not SSC, the control proceeds through step 419, and further to step 420, so as to decrease the count by 1, thereby making the count to −5. Therefore, in step 421, the judgement becomes no, and the control proceeds to step 422, identifying such an irregularity as error F during a light turn, similar to error J of FIG. 18 identified during a left turn.

Figure 20:
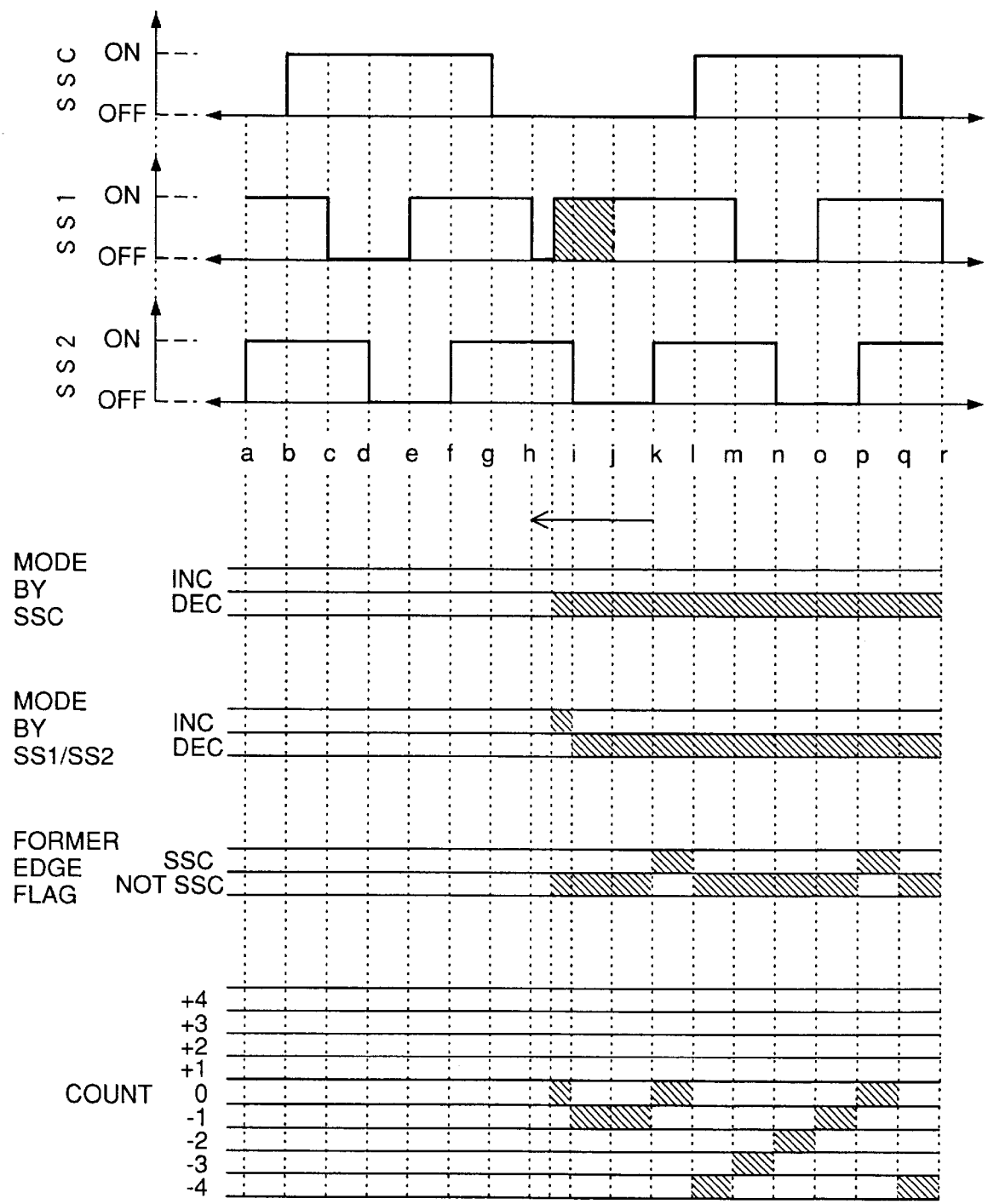
FIG. 20 is a set of diagrams similar to FIG. 10, showing an example of an operation which identifies an error named error H.

When the trailing edge of one of the pulses to be generated by the sensor SS1 at position "j" during a right turn delays behind the leading edge of an on-pulse detected by the sensor SS2 at position "i" as shown in FIG. 20, the count set to −1 is maintained up to position i as shown in the bottom rank of FIG. 20. When the leading edge of the on-pulse is detected by the sensor SS2 at position "i", the control in the flowchart of FIG. 6 proceeds to step 430, and since the judgement of step 430 is yes, the control proceeds to step 440 and the increase mode processing of FIG. 9 is executed. In step 441, the judgement is no, and the control proceeds to step 445. The judgement in step 445 is again no, and the control proceeds to step 449, and then to step 450, where the count is increased by 1, so that the count is made 0, thereafter the control returns through steps 451, 453, 454 and 460.

When the extended trailing edge is detected by the sensor SS1 at a position between i and h, the control in the flowchart of FIG. 6 proceeds to step 400, and since the answer of step 400 is no, the control proceeds to step 440 to execute the increase mode processing of FIG. 9. In step 441, the judgement is now yes, so that control proceeds to step 442, and it is judged if the mode by SS1/SS2 is the decrease mode DEC. As will be confirmed by the fifth rank of FIG. 20, the mode by SS1/SS2 has been changed to the increase mode INC at position "i". Therefore, the judgement of step 442 is no, and the control proceeds to step 443, and it is judged if the former edge flag is SSC. As will be again confirmed by the fourth rank of FIG. 20, at this stage the former edge flag is NOT SSC. Therefore the judgement of step 443 is no, and the control proceeds to step 444, identifying such an irregularity as error H.

Figure 21:
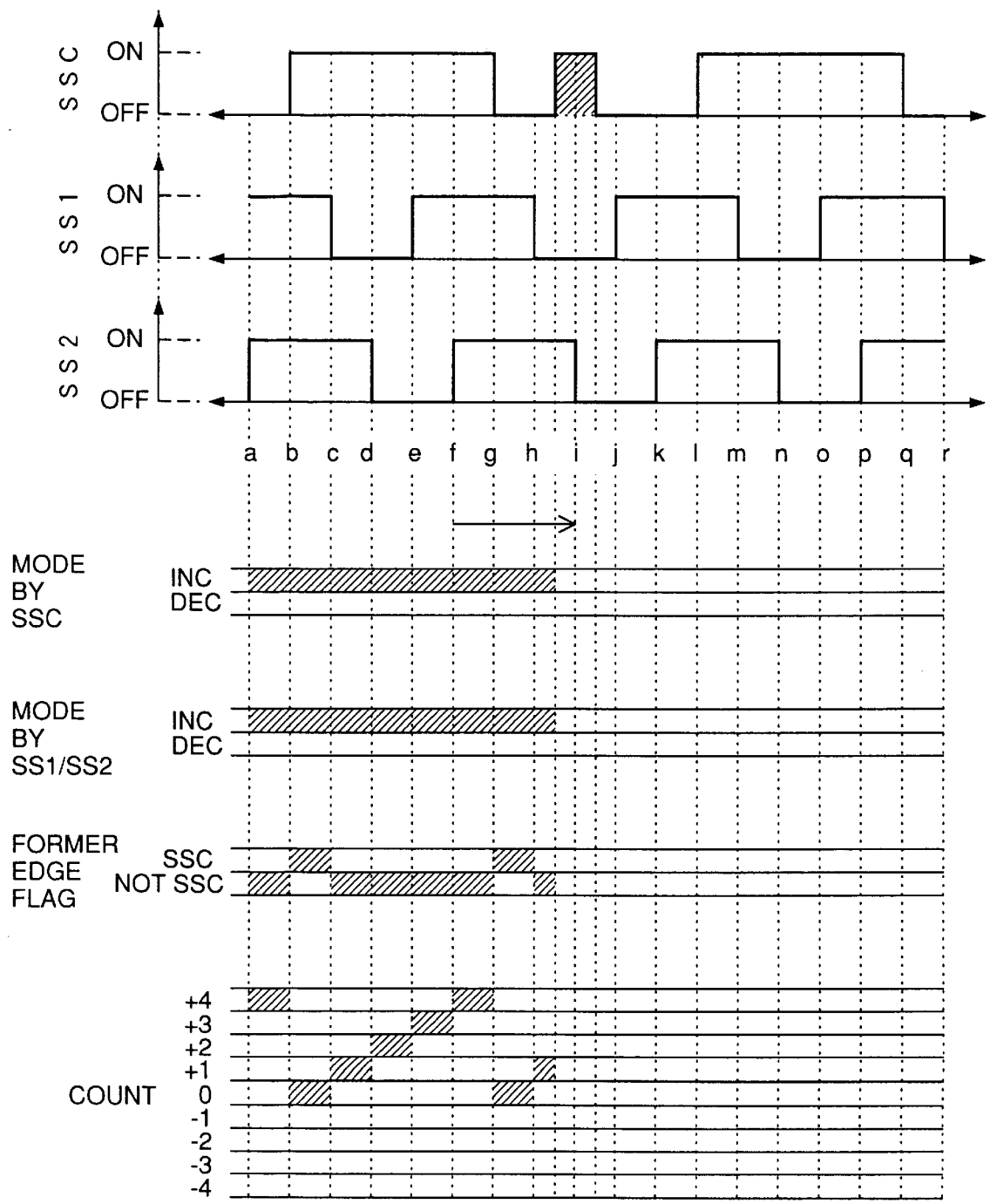
FIG. 21 is a set of diagrams similar to FIG. 10, showing an example of an operation which identifies the error named error B.

The irregularities of the pulses caused by the electrical noises also occur as an additional pulse generated between two successive regular pulses as exemplarily shown in FIGS. 21–24. The operations of the embodiment described with reference to FIGS. 1–9 for detection and identification of these irregularities will be appreciated on an analogy with the examples of the irregularities shown in FIGS. 13–20 and the above descriptions, based upon the illustration of the accompanying fourth to seventh ranks of diagrams about the modes by SSC and SS1/SS2 and the count, and the order of the steps executed shown hereinbelow. Therefore, any further detailed descriptions are omitted for the brevity of the specification:

Final steps executed in FIG. 21:
Starting from position "h": 330-340-360-390-400-440-441-442-443-445-446-448-449-450-451-453-454-460-550-50-250-300-310-320-330-340-360-370-371-372 (error B)

Figure 22:
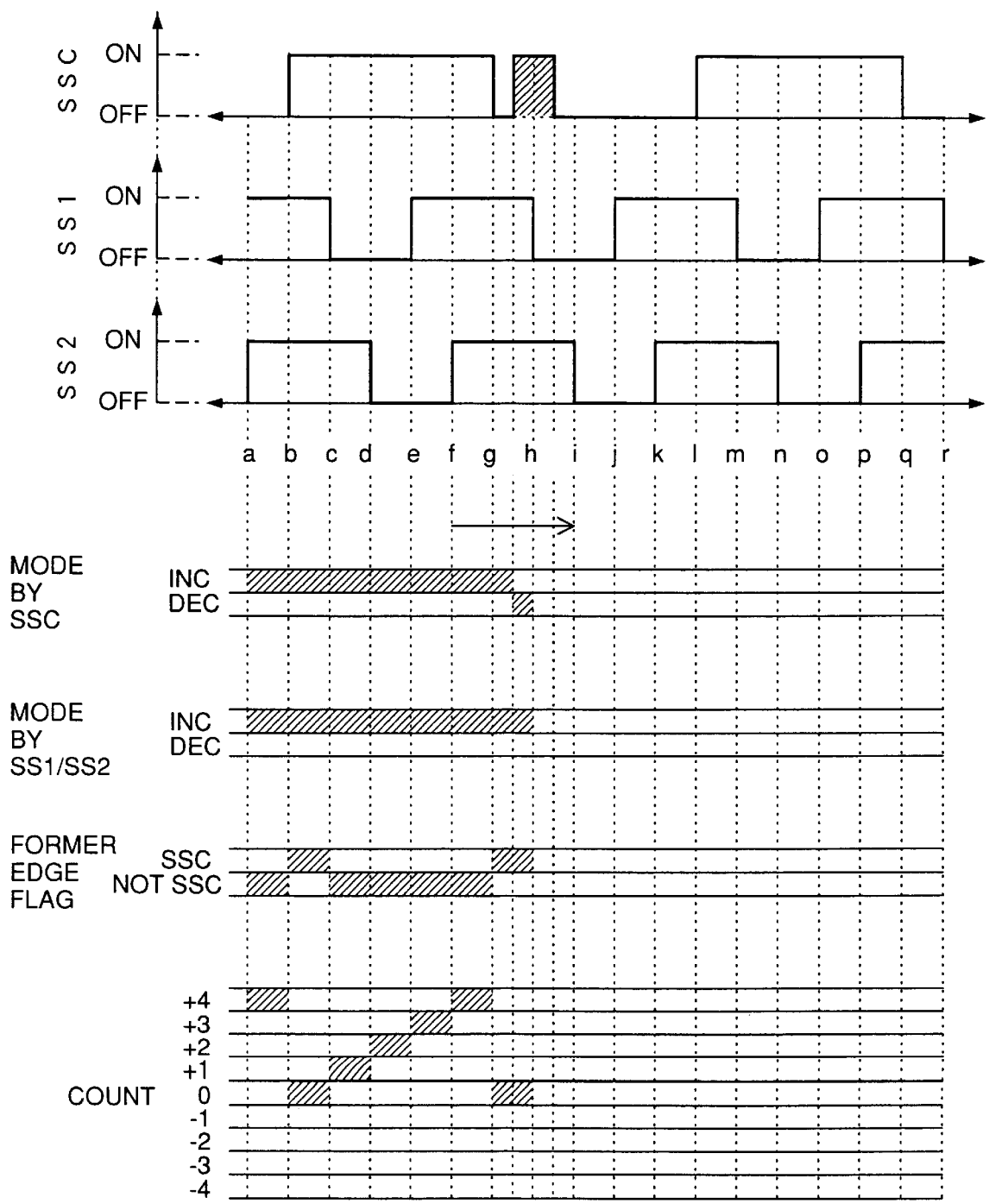
FIG. 22 is a set of diagrams similar to FIG. 10, showing an example of an operation which identifies the error named error I.

Final steps executed in FIG. 22:
Starting from position "g": 330-340-370-371-373-375-376-380-381-385-386-388-460-550-50-250-300-310-320-330-340-360-370-371-373-374-380-381-382-384-388-460-550-50-250-300-310-320-330-340-360-390-400-440-441-442-443-445-446-447 (error I)

Figure 23:
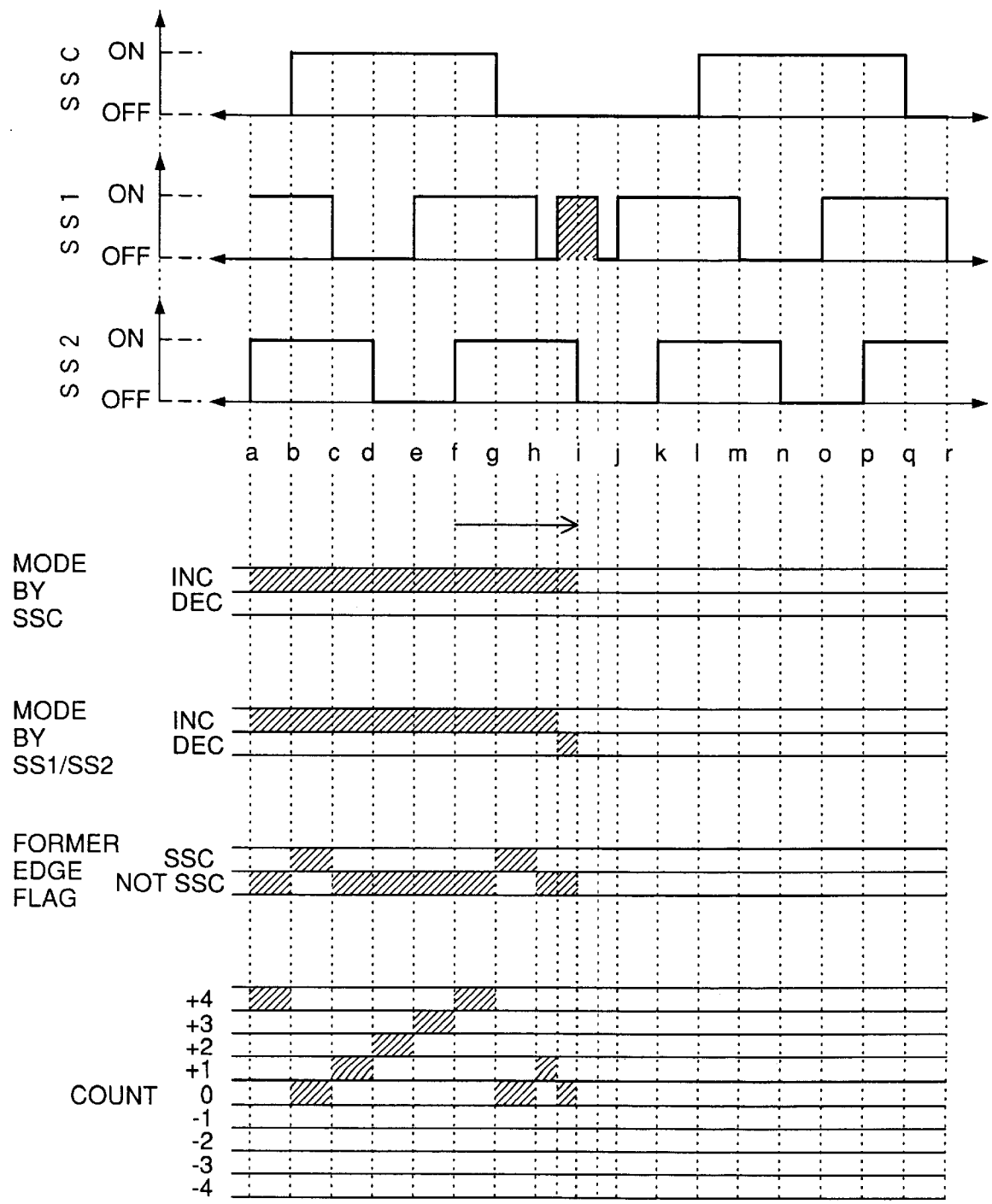
FIG. 23 is a set of diagrams similar to FIG. 10, showing an example of an operation which identifies the error named error D.

Final steps executed in FIG. 23:
Starting from position "h": 330-340-360-390-400-440-441-442-443-445-446-448-449-450-451-453-454-460-550-50 -250-300-310-320-330-340-360-390-400-410-411-415-419-420-421-423-424-460-550-50 -250-300-310-320-330-340-360-390-430-410-411-412-413-414 (error D)

Figure 24:
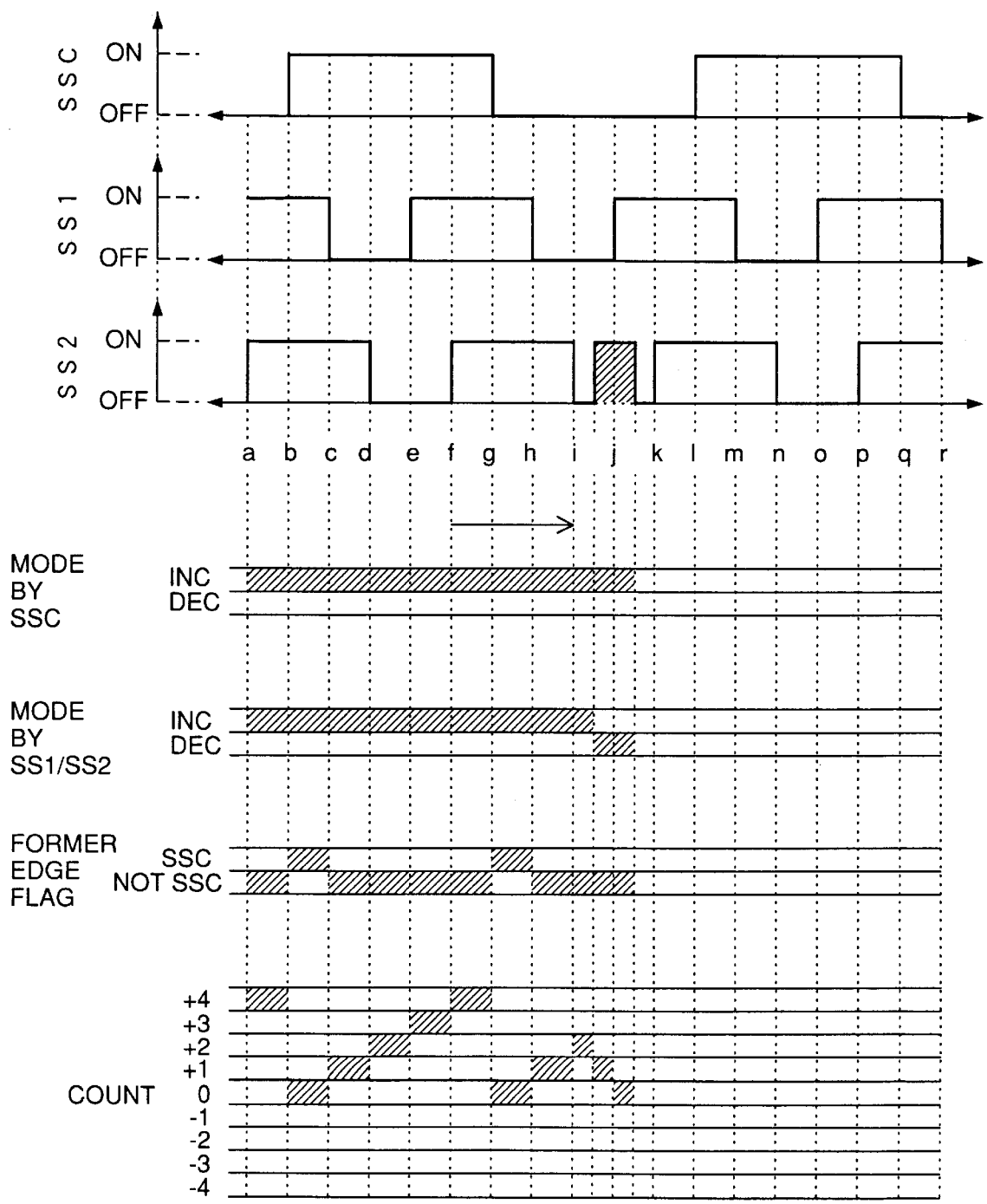
FIG. 24 is a set of diagrams similar to FIG. 10, showing an example of an operation which identifies the error named error D.

Final steps executed in FIG. 24:
Starting from position "i": 330-340-360-390-430-410-411-415-419-420-421-423-424-460-550-50-250-300-310-320-330-340-360-390 -430-410-415-419-420-421-423-424-460-550-50-250-300-310-320-330-340-360-390-400-410-411-415-419-420-421 423 -424-460-550-50-250-300-310-320-330-340-360-390-430-410-411-412-413-414 (error D)

It will be appreciated that the irregularities shown in FIGS. 13–24 are also detectable and identifiable when they occur during a turn in the direction opposite thereto, as the same or different names of errors according to the cases.

Further, as will be appreciated from above, all such errors are detected, when occurred, immediately before the measurement proceeds a few times of the unit angle, and the measurement process is initialized so that the errors are not accumulated. Further, in the embodiment shown in FIG. 5, when any such error occurred more than three times, the measurement operation of the device is automatically stopped and the record of the errors is shown for attention.

Although the present invention has been described in detail with respect to a particular embodiment thereof, it will be apparent for those skilled in the art that other various embodiments or modifications about the shown embodiment are possible without departing from the spirit of the present invention.

What is claimed is:

1. A device for measuring a rotation angle of a rotary element, comprising:

first, second and third detection means;

rotary means rotatable about a central axis thereof in accordance with a rotation of the rotary element, the rotary means having first and second circular arrays of signaling means arranged coaxially around the central axis thereof, the first array of signaling means being adapted to be detectable by the first detection means so as to generate a first signal alternating between "on" and "off" each time the rotary means rotates five times of a unit angle, the second array of signaling means being adapted to be detectable by the second and third detection means so as to generate second and third signals, respectively, the second and third signals each alternating between either "on" and "off" or "off" and "on" each time when the rotary means rotates alternatively two times and three times of the unit angle, the "on" and "off" alternations of the first, second and third signals being shifted from one another by an integer times of the unit angle;

means for increasing a measurement value of the rotation angle of the rotary element by the unit angle each time when one of the "on" and "off" alternations of the first, second and third signals successively occurs in a first order with regard to the first, second and third signals corresponding to a rotation of the rotary element in a first rotational direction, while decreasing the measurement value by the unit angle each time when one of the "on" and "off" alternations of the first, second and third signals successively occurs in a second order with regard to the first, second and third signals corresponding to a rotation of the rotary element in a second rotational direction opposite to the first rotary direction so as to provide the measurement value with a positive/negative sign indicative of the rotational direction; and means for checking each occurrence of the "on" and "off" alternations of the first, second and third signals with respect to at least one of the first and second orders in each set of five consecutive occurrences of the "on" and "off" alternations, so as to detect an error in the order, when occurred.

2. A device according to claim 1, further comprising:
means for counting each detection of an error by the checking means, so as to stop the rotation measurement operation of the device when the count reaches a predetermined count number.

3. A device according to claim 2, further comprising:
means for dispatching a warning signal when the predetermined number of errors have been counted.

4. A device according to claim 1, wherein the rotary means comprise a disk member, the signaling means comprise first and second circular arrays of openings formed therein such that each opening presents a pair of radial edges circumferentially spaced with an angle of a corresponding multiple of the unit angle, and the first, second and third detection means comprise first, second and third sets of light emitting diode and photo transistors, each set of the light emitting diode and the photo transistor being adapted to detect the radial edges of the corresponding array of the openings according to whether or not a light beam emitted from the light emitting diode is received by the photo transistor through a corresponding one of the openings.

5. A device according to claim 4, wherein the openings of the first array are each a notch open to a periphery of the disk.

6. A device according to claim 4, wherein each of the openings of the second array has a circumferential length corresponding to three times of the unit angle, spaced apart from opposite adjacent ones of openings by a circumferential length corresponding to two times of the unit angle.

7. A device according to claim 1, wherein the checking means comprise:

means for determining rotational direction anticipated at each occurrence of the "on" and "off" alternations of the first, second and third signals, so as to discriminate an occurrence of a change of the rotational direction of the rotary element from an error in the order.

* * * * *